US008751922B2

(12) United States Patent
Epstein

(10) Patent No.: US 8,751,922 B2
(45) Date of Patent: Jun. 10, 2014

(54) METHODS AND APPARATUSES TO ASSEMBLE, EXTRACT AND DEPLOY CONTENT FROM ELECTRONIC DOCUMENTS

(75) Inventor: Samuel S. Epstein, Sammamish, WA (US)

(73) Assignee: Zalag Corporation, Sammamish, WA (US)

( * ) Notice: Subject to any disclaimer, the term of this patent is extended or adjusted under 35 U.S.C. 154(b) by 1178 days.

(21) Appl. No.: 11/501,970

(22) Filed: Aug. 9, 2006

(65) Prior Publication Data

US 2007/0038643 A1 Feb. 15, 2007

Related U.S. Application Data

(60) Provisional application No. 60/706,734, filed on Aug. 9, 2005.

(51) Int. Cl.
*G06F 17/21* (2006.01)
(52) U.S. Cl.
USPC ............................................. 715/234
(58) Field of Classification Search
USPC ................................................. 715/277, 234
See application file for complete search history.

(56) References Cited

U.S. PATENT DOCUMENTS

| | | | | |
|---|---|---|---|---|
| 5,895,476 A | * | 4/1999 | Orr et al. | 715/202 |
| 5,895,477 A | * | 4/1999 | Orr et al. | 715/202 |
| 5,903,902 A | * | 5/1999 | Orr et al. | 715/202 |
| 5,983,227 A | | 11/1999 | Nazem et al. | |
| 6,094,671 A | * | 7/2000 | Chase et al. | 709/201 |
| 6,278,448 B1 | * | 8/2001 | Brown et al. | 715/866 |
| 7,047,033 B2 | | 5/2006 | Wyler | |
| 7,200,801 B2 | * | 4/2007 | Agassi et al. | 715/202 |
| 2001/0034771 A1 | * | 10/2001 | Hutsch et al. | 709/217 |
| 2001/0044810 A1 | | 11/2001 | Timmons | |
| 2002/0124182 A1 | * | 9/2002 | Bacso et al. | 713/200 |
| 2002/0165988 A1 | * | 11/2002 | Khan et al. | 709/246 |
| 2003/0028896 A1 | * | 2/2003 | Swart et al. | 725/127 |
| 2003/0032409 A1 | * | 2/2003 | Hutcheson et al. | 455/414 |
| 2003/0065645 A1 | * | 4/2003 | Itoh et al. | 707/1 |

(Continued)

FOREIGN PATENT DOCUMENTS

EP 0834822 A2 4/1998

OTHER PUBLICATIONS

Ducharme, B.; "Using the W3C XSLT Specification"; XML.com; http://www.xml.com/pub/a/2001/06/06/xsltspec.html.

(Continued)

*Primary Examiner* — Frank D Mills
(74) *Attorney, Agent, or Firm* — Schwabe, Williamson & Wyatt, P.C.

(57) ABSTRACT

Embodiments of the present invention permit the specification and servicing of aggregations of content constituent parts that derive from electronic documents. An incorporated content constituent part may correspond to any constituent part of any accessible document. In various embodiments, information derived from the intended layouts of source documents is employed to construct specifications of the constituent parts. The specifications may include search conditions. Graphic methods may be employed to construct the specification. Embodiments of the present invention enable content aggregations to appear in display presentations whose layouts may be adaptive to varying degrees. In various embodiments, flexible content-shifting methods are employed for display presentations of content aggregations. Resultantly, the display of content aggregations on mobile and other devices may be effectuated without wasting download bandwidth and display screen real estate.

24 Claims, 5 Drawing Sheets

(56) References Cited

U.S. PATENT DOCUMENTS

| | | | |
|---|---|---|---|
| 2003/0079177 A1* | 4/2003 | Brintzenhofe et al. | 715/500 |
| 2003/0101412 A1* | 5/2003 | Eid | 715/513 |
| 2003/0137538 A1* | 7/2003 | Hesmer et al. | 345/760 |
| 2003/0217121 A1* | 11/2003 | Willis | 709/219 |
| 2004/0003096 A1* | 1/2004 | Willis | 709/228 |
| 2004/0003097 A1* | 1/2004 | Willis et al. | 709/228 |
| 2004/0019850 A1* | 1/2004 | Purvis et al. | 715/517 |
| 2004/0019851 A1* | 1/2004 | Purvis et al. | 715/517 |
| 2004/0019852 A1* | 1/2004 | Purvis | 715/517 |
| 2004/0054749 A1* | 3/2004 | Doyle et al. | 709/217 |
| 2004/0098451 A1* | 5/2004 | Mayo | 709/203 |
| 2004/0143600 A1* | 7/2004 | Musgrove et al. | 707/104.1 |
| 2004/0205472 A1* | 10/2004 | Purvis | 715/500 |
| 2004/0205493 A1* | 10/2004 | Simpson et al. | 715/501.1 |
| 2004/0216034 A1* | 10/2004 | Lection et al. | 715/500.1 |
| 2004/0230947 A1* | 11/2004 | Bales et al. | 717/110 |
| 2004/0239681 A1 | 12/2004 | Robotham et al. | |
| 2005/0015718 A1* | 1/2005 | Sambhus et al. | 715/513 |
| 2005/0022236 A1* | 1/2005 | Ito et al. | 725/39 |
| 2005/0034055 A1* | 2/2005 | Rangan et al. | 715/500 |
| 2005/0055420 A1* | 3/2005 | Wyler | 709/217 |
| 2005/0055635 A1* | 3/2005 | Bargeron et al. | 715/525 |
| 2005/0187895 A1* | 8/2005 | Paya et al. | 707/1 |
| 2005/0246632 A1* | 11/2005 | Guido et al. | 715/517 |
| 2005/0248790 A1* | 11/2005 | Ornstein et al. | 358/1.12 |
| 2005/0251735 A1* | 11/2005 | Dunietz et al. | 715/513 |
| 2005/0251739 A1* | 11/2005 | Shur et al. | 715/517 |
| 2006/0004703 A1* | 1/2006 | Spivack et al. | 707/2 |
| 2006/0010390 A1* | 1/2006 | Guido et al. | 715/742 |
| 2006/0029125 A1* | 2/2006 | Kobashi et al. | 375/222 |
| 2006/0136809 A1* | 6/2006 | Fernstrom | 715/505 |
| 2006/0150088 A1* | 7/2006 | Kraft et al. | 715/517 |
| 2006/0155700 A1* | 7/2006 | Dejean et al. | 707/6 |
| 2006/0184617 A1* | 8/2006 | Nicholas et al. | 709/203 |
| 2006/0225094 A1* | 10/2006 | Facemire et al. | 725/45 |
| 2006/0235935 A1* | 10/2006 | Ng | 709/208 |
| 2006/0259462 A1* | 11/2006 | Timmons | 707/3 |
| 2007/0027932 A1* | 2/2007 | Thibeault | 707/200 |
| 2007/0041035 A1* | 2/2007 | Sembower et al. | 358/1.15 |
| 2007/0079236 A1* | 4/2007 | Schrier et al. | 715/517 |

OTHER PUBLICATIONS

International Preliminary Report on Patentability for PCT Application No. PCT/US2006/031266 mailed Feb. 21, 2008.

Amer-Yahia, S. et al.; XQuery 1.0 and XPath 2.0 Full-Text, W3C Working Draft Apr. 4, 2005; http://www.w3.org/TR/2005/WD-xquery-full-text-20050404/, 2005.

Berglund, A. et al.; XML Path Language (XPath) 2.0, W3C Working Draft Apr. 4, 2005; http://www.w3.org/TR/2005/WS-xpath20-20050404/, 2005.

Boag, S. et al.; XQuery 1.0: An XML Query Language, W3C Working Draft Apr. 4, 2005; http://www.w3.org/TR/2005/WD-xquery-20050404/, 2005.

DeRose, S. et al.; XML Linking Language (XLink) Version 1.0, W3C Recommendation Jun. 27, 2001; http://www.w3.org/TR/2000/REC-xlink-20010627/, 2001.

DeRose, S. et al.: XML Pointer Language (XPointer) Version 1.0, W3C Candidate Recommendation Sep. 11, 2001; http://www.w3.org/TR/2001/CR-xptr-20010911/, 2001.

DuCharme, B.; Using the W3C XSLT Specification; O'Rielly XML.com; Jun. 2001 [retrieved Apr. 24, 2007]; http://www.xml.com/pub/a/2001/06/06/xsltspec.html.

Gupta, S. et al.; Automating Content Extraction of HTML Documents; World Wide Web, 8:2, pp. 179-224, 2005.

Hogue, A. et al.; Thresher: Automating the Unwrapping of Semantic Content from the World Wide Web; Proceedings 14th International Conf. on World Wide Web; pp. 86-95, 2005.

Klyne, G. et al.; Resource Description Framework (RDF): Concepts and Abstract Syntax, W3C Recommendation Feb. 10, 2004; http://wvvw.w3.org/TR/2004/REC-rdf-concepts-20040210/, 2004.

Lin, S-H. et al.; Discovering Informative Content Blocks from Web Documents; Proceedings 8th ACM SIGKDD International Conf. on Knowledge Discovery and Data Mining; pp. 588-593, 2002.

Nagy, G.; Twenty Years of Document Image Analysis on PAMI; IEEE Transactions on Pattern Analysis and Machine Intelligence; 22:1, pp. 38-62, 2000.

Stevenson, M. et al.; A Semantic Approach to IE Pattern Induction; Proceedings 43rd Annual Meeting of the Association for Computational Linguistics, pp. 379-386, 2005.

Tsandilas, T. et al.; Usable Adaptive Hypermedia Systems; New Review of Hypermedia and Multimedia; 10:1, pp. 5-29, 2004.

Yu, S. et al.; Improving Pseudo-Relevance Feedback in Web Information Retrieval Using Web Page Segmentation; Proceedings 12th World Wide Web Conference; pp. 11-18, 2003.

PCT Search Report dated Sep. 13, 2007 for PCT Application No. PCT/US06/31266 (2 pages).

Information Disclosure Statement Categorization of Disclosed References dated Nov. 13, 2007 for U.S. Appl. No. 11/501,970 (3 pages).

European Search Report for EP Application No. 06801187.3, mailed on Jul. 14, 2011.

Abualsamid, A. "PHP & Hosted Applications a Flexible Scripting Language for Building Dynamic Web Pages", Dr. Dobb's Journal, M&T Publ., Redwood City, CA, U.S., vol. 26, No. 1, Jan. 1, 2001, pp. 56, 58, 60-63.

Macias, J. et al. "Dynamic Web Page Authoring by Example Using Ontology-Based Domain Knowledge", Proceedings of the 8th International Conference on Intelligent User Interfaces, IUI '03, Jan. 1, 2003, p. 133, New York, New York, USA.

Sugiura, A. et al. "Internet Scrapbook: Automating Web Browsing Tasks by Demonstration", Jan. 1, 1998 UIST '98. 11th Annual Symposium on User Interface Software and Technology Proceedings of the ACM Symposium on User Interface Software and Technology, San Francisco, CA Nov. 1-4, 1998.

2nd Notification of Office Action for CN Application No. 200680034718.6, mailed May 6, 2011.

* cited by examiner

METHODS AND APPARATUSES TO ASSEMBLE, EXTRACT AND DEPLOY CONTENT FROM ELECTRONIC DOCUMENTS

RELATED APPLICATIONS

This application is non-provisional application of provisional application 60/706,734, filed on Aug. 9, 2005, entitled METHODS AND SYSTEMS TO SERVICE PERSONALIZED AGGREGATIONS OF WEB CONTENT, and claims priority to the 60/706,734 application.

FIELD OF THE INVENTION

Embodiments of the present invention relate to the field of data processing, in particular, to tools, methods, and systems for the assembly, extraction and deployment of content from electronic documents.

BACKGROUND

Notwithstanding the significant advances made in the past decades, electronic document technology continues to suffer from a number of disadvantages preventing users from fully realizing the benefits that may flow from advances in computing and related technology.

Hypertext Markup Language or Cascade Style Sheet (HTML/CSS) provides facilities assembling content such as image files and video files from anywhere on the World Wide Web into a Web page or frame. Display of Web pages and frames is typically managed by Web browsers that incorporate the layout rules associated with HTML/CSS.

Much of the dynamic content on the Web is assembled into templates using server page technologies. Server page technologies may permit the assembly of content fragments from varied sources.

Various Web sites cycle visibility in a designated position among sets of content items, or shift visibility in a designated position across constituents of a single content item, using facilities provided by HTML/CSS and by scripting languages such as Javascript.

The very limited download bandwidth and screen real estate associated with mobile devices has motivated the creation of the WAP (Wireless Access Protocol) network. Because building a WAP site is labor intensive, the WAP network remains extremely small, in comparison to the World Wide Web, and has correspondingly less to offer users. For purposes of search, the World Wide Web is a vastly more powerful resource than the WAP network.

Limited download bandwidth and limited screen real estate has also motivated the creation of browsers that reformat HTML files for presentation on mobile devices. These mobile browsers reformat content so that horizontal scrolling is reduced. They may introduce page breaks into tall pages. They may remove or replace references to large files. They may replace fonts. They may offer distinctive user interfaces. Similar functionality is also offered by server transcoders that intercept user requests for HTML files. Such a server transcoder may be applied to reformat Web pages that satisfy search criteria. Current mobile browsers and server transcoders offer at most very rudimentary content extraction facilities, based on limited ranges of simple criteria.

Really Simple Syndication (RSS) feeds are Web page constituents that typically each occupy only a small proportion of a total Web page area. RSS feeds include time-varying links to other Web sites, with brief descriptions of the content items associated with the links. Software tools ("scrapers") may be used to automatically generate RSS feeds from Web pages. Scrapers identify link constituents on these Web pages.

Standards and proposed standards related to XML (Extended Markup Language), such as XPath, XQuery, XPointer, and XLink, provide more powerful facilities for accessing content than were available in the earlier days of the Web. However, content sources may differ drastically with respect to how they represent content, even when the content sources use the same dialect of the same language, and even when the content sources have very similar content. Effective use of XPath, XQuery, and similar technologies requires detailed knowledge of how content is represented in particular sources. With these technologies, an impractically large body of intricate code may be needed if content is to be drawn from a large number of potential sources.

Certain Web sites aggregate content from other Web sites. For example, a news aggregation Web site includes time-varying headlines from various Web news sites. These headlines double as links to the associated stories on the source sites. The dynamic content available on these Web sites is limited to a fixed repertory, from which users select the items they wish to view.

Certain Web sites allow users to personalize the assembly and display of information within tightly constrained limits. For example, a user may be able to choose which RSS feeds he/she wishes to include on his/her personalized page. The user may also be able to specify the assignment of the RSS feeds to display columns, the arrangements of the columns themselves, graphic treatments such as fonts and colors, and other minor display variations.

Whether taken individually or together, these technologies do not fully support flexible assembly, extraction and/or deployment of content from electronic documents, where the content items themselves, as opposed to links to the content items, appear on users' displays, where the content items need not correspond directly to any existing links, where the content items need not correspond to pages or frames, and where the content items may be drawn from any source whatever, including the public Web in its entirety. Whether taken individually or together, these technologies do not fully support aggregations of flexibly extracted content. Whether taken individually or together, these technologies do not fully support organizations of content for display that permit large amounts of varied content to be conveniently viewed, while the use of screen real estate is substantially minimized, while the use of download bandwidth is substantially minimized, and while the use of screen panning mechanisms such as scrollbars is substantially minimized. Such flexible assembly, extraction and organizations of content for display are especially needed for mobile devices. Whether taken individually or together, these technologies do not provide graphical methods for designating desired content that has to be assembled, extracted and/or organized from a variety of sources. Whether taken individually or together, these technologies do not provide efficient, effective and easy-to-use facilities for mediating between intuitive human perspectives on content and details of representations of content in markup languages.

DETAILED DESCRIPTION OF EMBODIMENTS OF THE INVENTION

Figure 1:
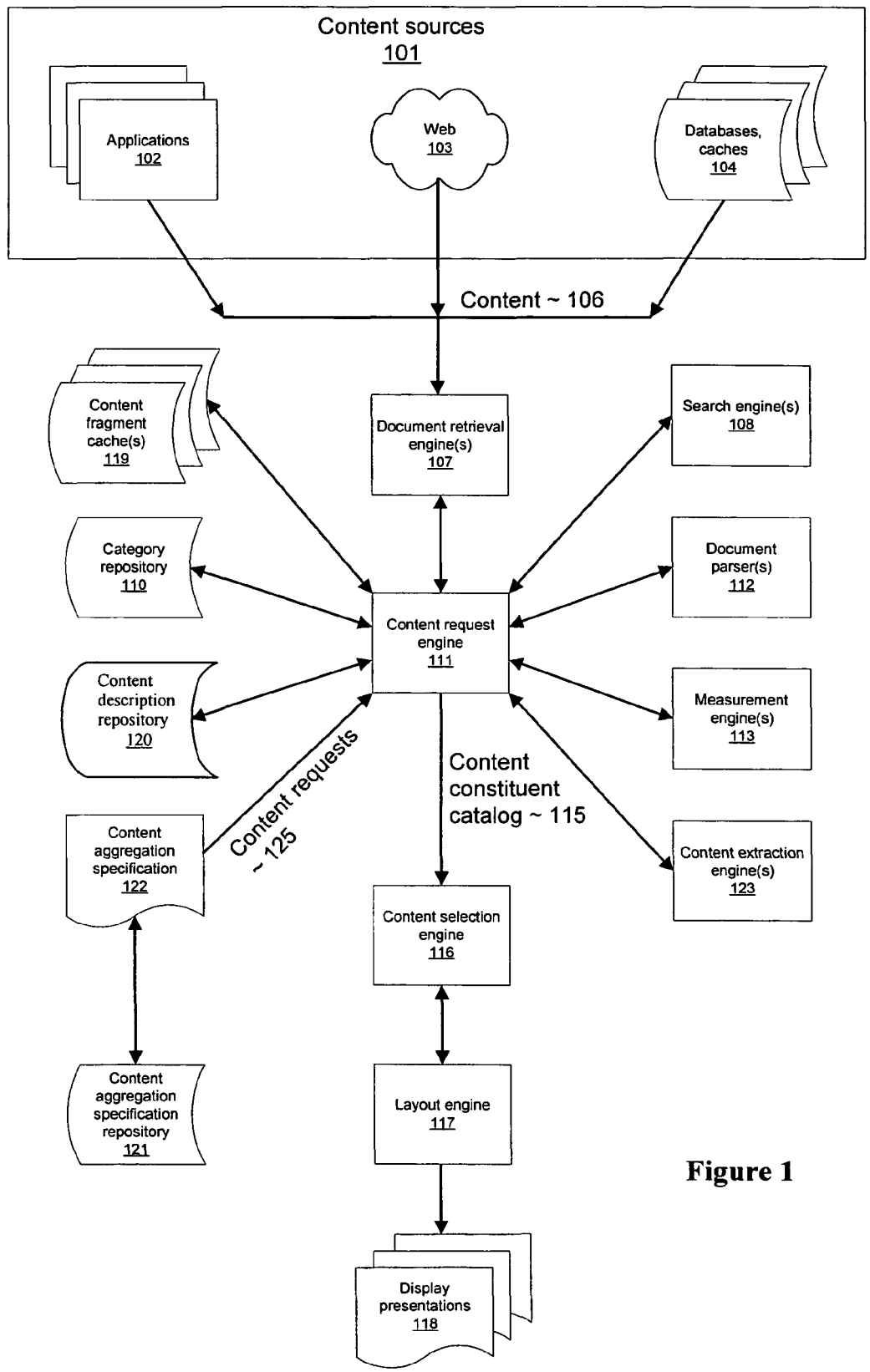
FIG. 1 illustrates an overview of the content assembly, extraction and deployment methods and apparatuses of the present invention, in accordance with various embodiments.

Illustrative embodiments of the present invention include but are not limited to methods and apparatuses that extract and deploy content from electronic documents.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Embodiments of the present invention permit the specification and servicing of aggregations of content that derives from electronic documents, where document content may be dynamic, where aggregations may incorporate any number of content items (with aggregations consisting of single content items corresponding to a degenerate but still practical case), where aggregations may be intended for any number of users, and where aggregation definitions may be more or less persistent. Specification of content aggregations can be incorporated in a client application, in a Web service, in a client Web browser plugin, in a script downloaded to the client Web browser, in an application service provider, in a content management system, or in a Web browser itself. Servicing of content aggregations can be incorporated in a client application, in a Web service, in a client Web browser plugin, in a script downloaded to the client Web browser, in an application service provider, in a content management system, or in a Web browser itself. The content may include Web and non-Web content. The various embodiments can be implemented on one or more computing devices (clients and/or servers); with a single thread, or with multiple threads in each computing environment. The various embodiments can be implemented with or without caching of content and/or intermediate working information (also referred to as annotations).

Aggregations of content may be compared to physical scrapbooks, with one important difference being that included content items may vary in time. Personalized aggregations of content are desirable for users because they give users optimally convenient access to the content that most interests them. Users might pay directly to license software that supports personalized aggregations of content. Or users might pay directly for subscriptions to a service that supports personalized aggregations of content. In addition, personalized aggregations of content present possibilities for advertising, and especially for targeted advertising. A service that supports personalized aggregations of content, such as Web content, might reserve space for advertising on constructed displays, and might deliver advertisements to a particular user according to a user profile that is wholly or partially based on the content that the user has selected for inclusion in his/her personalized aggregation of content.

Embodiments of the present invention enable aggregations of content to directly incorporate content from any accessible electronic source, including but not limited to the World Wide Web in its entirety. An incorporated content item may correspond to any constituent of any accessible document. Incorporated content items need not correspond to existing links. Content items themselves, as opposed to links to content items, may appear within aggregations. The specifications of content items may include search conditions. Embodiments of the present invention enable content aggregations to appear in display presentations whose layouts may be adaptive to varying degrees. Embodiments of the present invention provide flexible content-shifting methods for display presentations of content aggregations. Embodiments of the present invention provide graphic methods for specifying which content items are to be included in content aggregations, and for specifying how these content items will be organized in display presentations. Embodiments of the present invention support organizations of content for display that permit large amounts of varied content to be conveniently viewed, while the use of screen real estate is minimized, while the use of download bandwidth is minimized, and while the use of screen panning mechanisms such as scrollbars is minimized. The present invention thus enables the display of content aggregations on mobile and other devices without wasting download bandwidth and screen real estate. Embodiments of the present invention provide graphical methods for designating content to be extracted, and for designating organizations of content for display.

Embodiments of the present invention employ information derived from the intended layouts of source documents to construct specifications of content items that remain valid over documents from varied sources, and that remain valid over time. Embodiments of the present invention employ distinguished categories and description modifiers to facilitate the construction and maintenance of specifications of content items. Embodiments of the present invention employ methods of empirical optimization to replace content specifications with other content specifications that may be processed more efficiently at content-request time. Embodiments of the present invention employ a variety of additional pre-content-request-time optimizations and employ a variety of content-request-time optimizations.

Referring now to FIG. 1, wherein a block diagram illustrating an overview of the content assembly, extraction and deployment methods and apparatuses of the present invention, in accordance with various embodiments, is shown. As illustrated, for the embodiments, content request engine 111, incorporated with the teachings of the present invention, controls the processing and fulfillment of content requests, which may involve content from multiple electronic documents of multiple types and/or sources. Users and/or programs may submit individual content requests 125 to content request engine 111 directly, or content requests 125 may be associated with content aggregation specifications 122. Content aggregation specifications 122 may be retrieved from a content aggregation specification repository 121.

Content request engine 111 may look up in a content description repository 120 information that will help in processing a content request, or help in processing a constituent of a content request. Content request engine 111 may look up in a category repository 110 definitions of defined terms, together with other information that will help in processing a content request that contains occurrences of defined terms. Content request engine 111 may look up in one or more content fragment caches 119 content fragments that satisfy content requests, or that contain constituents that satisfy content requests, or that are contained in content items that satisfy content requests. Content request engine 111 may place intermediate results for content requests in content fragment caches 119.

For content requests that include search expressions, content request engine 111 may direct one or more search engines 108 to identify content 106 from a variety of sources 101, including but not limited to applications 102, Web 103, and content databases and caches 104. Search engines 108 may also identify content from content fragment caches 119. Search engines 108 represent a broad category of application that includes, but is not limited to, document search engines, string search engines, and structured content search engines. Document search engines represent a broad category of application that includes, but is not limited to, Web search engines, content management systems, and database management systems.

With documents containing desired content identified (using search engines 108 if necessary), content request engine 111 directs one or more document retrieval engines 107 to retrieve documents, or retrieves documents or other content fragments from one or more content fragment caches 119. In some cases, document search and document retrieval functionality may be combined in a single engine.

Content request engine 111 may direct retrieved documents and other content fragments to one or more document parsers 112, which provide structural information about retrieved documents and content fragments, e.g. in the form of tree or other graph structures. Content request engine 111 may direct parsed documents and content fragments to one or more measurement engines 113. In alternate embodiments, web search engines, content fragment caches etc. may return documents that have been pre-parsed or equivalently prepared. For these embodiments, content request engine 111 may direct the pre-parsed documents and other content fragments directly to one or more content extraction engines 123. Content extraction engines 123 may call string search engines 108 and measurement engines 113 directly, or may access the functionality of these engines through the mediation of content request engine 111, as shown in FIG. 1.

Content extraction engine 123 may access category repository 110 and content description repository 120 directly, or may access category repository 110 and content description repository 120 through the mediation of content request engine 111, as shown in FIG. 1. Content extraction engines 123 traverse documents and other content fragments and return sub-constituents of these documents and other content fragments, in some cases with added annotations. Measurement engines 113 provide information related to the intended layout and rendering of retrieved documents and their constituents.

The functionality of one or more of the following may be combined in a single engine: document retrieval engine(s) 107, search engine(s) 108, document parser(s) 112, measurement engine(s) 113.

In various embodiments of the present invention, content request engine 111 assembles content constituents into content constituent catalogs 115, in some cases adding information from one or more of the following: content request 125, category repository 110, content description repository 120, one or more content fragment caches 119, one or more search engines 108, one or more document parsers 112, one or more measurement engines 113.

In various embodiments of the present invention, the content constituent catalog is directed to a content selection engine 116, which works with a layout engine 117 to construct display presentations 118. Content extraction engine 123 may communicate with content selection engine 116 directly, or through the mediation of content request engine 111, as shown in FIG. 1.

While for ease of understanding, the functions performed by content request engine 111, content search engine 123 are illustrated as distinct components, in practice, their functions may be partitioned and assigned to different smaller modules and/or tasks. Alternatively, they may be combined in a single module. The various modules and/or tasks may be executed as a single thread, or as multiple threads where appropriate. In various embodiments, the execution of document retrieval engine(s) 107, search engine(s) 108, content request engine 111, document parser(s) 112, measurement engine(s) 113, content extraction engine(s) 123, content selection engine 116, and layout engine 118, and the storage of category repository 110, content request engine 120, and content fragment caches 119, may be on the same system, and in other embodiments, they may be on different systems, e.g. with 110, 111, 112, 113, 114, 116, 117, 119, 120, 121, and 123 on one server, and document retrieval engine(s) 107 and search engine(s) 108 on a different server. For these latter embodiments, communication between content request engine 111 and document retrieval engine(s) 107 and search engine(s) 108 may be in accordance with any one of a number of communication protocols, including but not limited to HTTP and/or HTTPS, with or without going through one or more communication modules/layers (where HTTP=Hypertext Transmission Protocol, and HTTPS=Hypertext Transmission Protocol Secured).

In various embodiments, content aggregation specification repository 121, category repository 110, content description repository 120, content fragment cache(s) 119, content request engine 111, and content extraction engines 123, together with document retrieval engine 107, search engine(s) 108, document parser(s) 112, measurement engine(s) 113, content selection engine 116, and layout engine 117, may be implemented as part of a "larger" product offering. For example, in various embodiments, all twelve components 107, 108, 110, 111, 112, 113, 116, 117, 119, 120, 121, and 123 may be implemented as part of a content delivery service. In still other embodiments, 107, 108, 110, 111, 112, 113, 119, 120, 121, and 123 may be part of a content delivery service, while content selection engine 116 and layout engine 117 may be part of an enhanced Web browser or publishing tool. In still other embodiments, other implementation arrangements may also be possible.

I. Content Descriptions and Content Requests

Embodiments of the present invention may include exchange of "content descriptions" and "content requests" between selected ones of the earlier described components as set forth below.

A content description, for ease of understanding, may be considered analogous to a noun phrase. Content descriptions have "heads," which are analogous to nouns. A content description head is analogous to a common noun. For example, a content description head may correspond to a category of markup file, as in "HTML file" or "XML file," or a content description head may correspond to a simple category of markup constituent, as in "HTML table." A content description head may also correspond to a proper noun, as in "the World Wide Web" or "www*senate*gov" (referring to a particular Web site). Other "proper" content description heads may correspond to particular servers, or to particular directories on particular servers, or to particular databases, or to particular instances of content management systems.

Content descriptions may include analogs of relative clauses, as in "HTML file that's located on the World Wide Web," or "XML file that matches haydn." Relative clause analogs may include embedded relative clause analogs, as in "HTML table that contains a text that matches haydn." And relative clause analogs may include Boolean connectives, as in "HTML table that contains a text that matches haydn and that is contained by an HTML DIV." Relative clause analogs may include existential, universal, and numerical quantifiers, as in "HTML table that contains at least three HTML paragraphs." Hereafter, the relative clause analogs within content requests will be called "qualifications." Qualifications may be based on information that's native to content sources. For markup documents, native information corresponds to the document parse tree. Hereafter, qualifications that are based on information that's derived through the application of engines other than parsers will be called "derived qualifications."

Hereafter, the heads of qualifications will be called "relationships." Some representative relationships are "match" (as in matching a certain search expression), "contain" (as in containing a certain sub-constituent), "haveURI" (as in having a certain URI as an address), "haveArea" (as in having an certain area when rendered in certain circumstances), "haveHTMLTag" (as in having a certain HTML tag), "haveCSSWidth" (as in having a certain width as the value of the CSS width attribute), and "greater than." Some objects of relationships are possible heads of embedded content descriptions. Others, such as quantities of units and such as search expressions, are not. Through the inclusion of content descriptions as objects of relationships, content descriptions may include embedded content descriptions, to any level of recursion.

Content descriptions with qualifications may be called "qualified descriptions." Content descriptions with derived qualifications may be called "derived descriptions." As a matter of notational convenience, qualified descriptions will be represented according to the following scheme: [description-head (relationship object)], where content descriptions are delimited by square brackets, and where qualifications are delimited by parentheses. A "content request" is a content description that's annotated with one or more directives to deliver content fragments, where these directives may apply to the content description itself and/or to one or more of its embedded content descriptions. Hereafter, content descriptions whose conforming content fragments are to be delivered in response to a content request will be delimited by curly brackets. For example, [HTMLTable (contain {text (match haydn)})] designates HTML tables that contain texts that match haydn, and also designates texts that match haydn that are contained in HTML tables. With containedBy as the inverse of contain, it's equivalent to {text (containedBy [HTMLTable] && match haydn)}. The curly brackets in these expressions indicate requests to deliver the designated texts. In {HTMLTable (contain {text (match haydn)})}, both HTML tables and texts are requested. "Non-restrictive" qualifications may be introduced with angle brackets, as in {HTMLTable (contain [text (match haydn)] && <contain {text (match boccherini)}>)}. This content request requests delivery of HTML tables that contain texts that match haydn. It includes a directive to deliver the texts matching boccherini that are contained in these HTML tables. The qualification <contain {text (match boccherini)}> does not affect the set of HTML tables associated with the content description. It is a directive to deliver any texts matching boccherini that may be found in HTML tables belonging to this set.

In content descriptions, a single variable may appear to the immediate left of a right square bracket or a right curly bracket. For example, the variable x appears in {HTMLTable (contain [text (match haydn) x])}. Variables may also appear to the immediate right of objects of relationships that are not content descriptions. Given such an occurrence of a variable within a content description, the variable can reappear within the content description, to the right of the original occurrence, as the head of an embedded content description or as the object of a relationship, as in {captionedImage (containedBy [newsArticle x] && renderAbove [advertisement(containedBy [x])])}, which requests captioned images in news articles, including just the captioned images that are positioned above at least one advertisement in the containing news article when the news article is rendered. Explicit quantifiers may be included to the immediate left of left square brackets and left curly brackets, as in {captionedImage (containedby [newsArticle x] && renderAbove every[advertisement(containedBy [x])])}. When no quantifier appears with a description, there's an implicit existential quantifier. In some cases, it may be necessary to explicitly provide not only a quantifier, but a domain of quantification. In this notational scheme, in order to bind a description that consists only of a variable, it isn't necessary that the description appear in the syntactic scope of the explicit or implicit quantifier associated with the description that introduces the variable. However, the bound variable must appear to the right of the description that introduces the variable. (The notation is analogous in this respect to such natural language sentences as every man that owns a donkey beats it.) It's straightforward to provide a more formal definition of content description, of the various constituents of content descriptions, and of scope rules.

Embodiments of the present invention may organize possible heads of content descriptions into a directed acyclic graph of sub-categories and super-categories. Such organizations may be recorded in a category repository 110.

In order for a content request to be valid, each of its qualifications must be valid. Relationships, for ease of understanding, may be considered analogous to transitive verbs. The validity of a qualification depends on the description head to which the qualification applies, the main relationship of the qualification, and the object of the relationship. For example, {HTMLTable (link [300 pixels])} is not valid. HTML tables may contain constituents that link, but do not themselves link. A pixel measurement is not a possible object of the link relationship. Detailed grammars of content requests may include classifications of possible subjects and objects of relationships.

In various embodiments, in order for a content request to be productive, all its branches are required to be grounded in description heads that actually correspond to content sources.

For example, {captionedImage (containedBy [newsArticle (containedBy [page (locatedAt [www*senate*gov])])])} requests captioned images in news articles in pages at the www.senate.gov site. Context may provide implicit grounding for content requests. For example, it may be understood that a content request at hand applies to a particular markup parse tree, or that another content request applies to the entire World Wide Web.

Analogous to the way in which database views may be defined in terms of queries, content sets may be defined in terms of content requests. Analogous to the way in which as database views may be materialized, content sets may be cached in a more or less persistent content fragment cache 119. Embodiments of the present invention recursively apply content requests to the results of previous content requests. Analogous to the way in which the results of database queries may be ordered or otherwise structured according to various properties, embodiments of the present invention order or otherwise structure content sets according to various properties. Embodiments of the present invention may further specify that only part of a structured content set will be delivered to downstream processes. For example, given a content request whose result is a set of images, it may be specified that only the image with largest area is delivered to the user. For another example, given a content request whose result is a set of product descriptions from a single document, it may be specified that the only product description delivered to the user is the one that is positioned most closely to the upper left corner of the document when the document is rendered as a page. For another example, given a content request whose result is a set of texts, it may be specified that only the text with the highest density of occurrences of haydn is delivered to the user.

Embodiments of the present invention (e.g. content selection engine 116) may apply expurgations to content fragments before these content fragments are presented to users. Various embodiments use content requests to specify constituents to be expurgated. These content requests may be called "expurgation specifications." Various embodiments supplement content requests with expurgation specifications. Once the content fragments corresponding to the content request have been extracted, for each of these content fragments, the sub-constituents that correspond to expurgation specifications are deleted. Expurgation specifications may apply to single content requests, or may apply as part of a general policy on content presentation. In various embodiments, expurgations may be recorded as tentative, allowing the content selection engine 116 and layout engine 117 shown in FIG. 1 to determine which tentative expurgations to apply.

Embodiments of the present invention capture content descriptions with aggregation calls, as discussed in paragraphs 0082-0089. Alternative embodiments of the present invention capture content descriptions with amalgams and extensions of the XPath family of proposed standards, including XQuery, XQuery Full Text, XPointer, and XLink. Other alternative embodiments of the present invention capture content descriptions in procedural code in languages such as C or JAVA™.

A. Complex Tree Patterns

Other alternative embodiments of the present invention capture content descriptions in terms of other languages or formalisms. For example, embodiments of the present invention capture content descriptions in terms of "complex tree patterns."

A "simple tree pattern," is a tree of nodes connected by branches, with zero or more terminal nodes specified as wildcards, where a wildcard node may correspond to any number of sibling subtrees. It's assumed here that non-wildcard node match conditions may be more complex than simple checks on equality of labels. For example, a node match condition may involve the value assigned to a node attribute. A node match condition may be a Boolean combination of node match conditions. A "compound tree pattern" is either a simple tree pattern or a Boolean combination of simple tree patterns. A "simple contextual tree pattern" is similar to a simple tree pattern, except that one of its non-wildcard terminal nodes is designated as the "context." A "compound contextual tree pattern" is either simple contextual tree pattern or a Boolean combination of contextual tree patterns. A "complex tree pattern" is an ordered pair whose first member is a compound contextual tree pattern and whose second member is either a compound tree pattern or a complex tree pattern. Note that complex tree patterns may be constructed recursively. The interpretation of a complex tree pattern is that the first member identifies the contexts where instances of the second member will count as matches. (As a matter of definition, if the first member of a complex tree pattern is null, there are no restrictions on where the second member may be sought.)

For example, consider a simple contextual tree pattern with root labeled A, where the root has two children. The left child of the root has label B and is designated as the context. The right child is a wildcard. Consider further a simple tree pattern with root labeled C and with no other nodes. A complex tree pattern that comprises these two patterns is matched by any tree T such that the root of T has label C and such that the root of T is a descendant of a node N, where N has label B and where N is the leftmost child of a node with label A.

For another example, consider a simple contextual tree pattern with root labeled D, where the root has two children. The right child of the root has label E and is designated as the context. The left child is a wildcard. Consider a complex tree pattern whose first member is this contextual tree pattern, and whose second member is the complex tree pattern of the preceding paragraph. This complex tree pattern is matched by any tree T such that the root of T has label C and such that the root of T is a descendant of a node $N_1$, where $N_1$, has label B, where $N_1$ is the leftmost child of a node $N_2$ with label A, where $N_2$ is a descendant of a node $N_3$ with label E, and where $N_3$ is the rightmost child of a node with label D.

The motivation for the definition of complex tree pattern is for describing cases such as the following (for an HTML document): within the rightmost TABLE that's a child of BODY, find the IMG tags whose WIDTH attributes are set to values greater than 300 pixels.

B. Authoring

Embodiments of the present invention may elicit content descriptions and content requests, whether from end users or information technologists or software developers, according to an iterative two-step process. The first step is generation of a candidate formulation for the content description or content request. The second step is submission of the candidate formulation to the user (in a broad sense of "user") for feedback. Various embodiments acquire multiple candidate formulations before proceeding to the feedback step.

In various embodiments, an elicited content description or content request may be associated with one or more content aggregations, with the associations recorded in a content aggregation specification repository 121. In various embodiments, detailed information on an elicited content description or content request may be recorded in a content description repository 120. In various embodiments, content aggregation specification repository 121 and content description repository 120 may include records that have no connection to the elicitation of content descriptions and content requests from users.

Various embodiments acquire the first candidate formulation of a content description or content request with a graphical user interface such as those found in Web authoring tools. The user constructs a graphical characterization of the content description to be formulated. If the content description is a content request, the user annotates the requested fragments within this graphical characterization. Prior art algorithms then associate the user's graphical characterization with markup. Alternative embodiments acquire the first candidate definition by having the user load a document containing an instance that satisfies the content description or content request into a browser or other software program that renders documents. Information identifying the document source is recorded. The user may then drag a mouse over the rendered instance. Prior art algorithms associate the coordinates of the mouse drag with coordinates of rendered markup constituents, and a best-fit constituent is hypothesized, possibly taking into consideration factors such as whether a candidate constituent is a sub-constituent of a constituent with only slightly larger area. Other alternative embodiments acquire the first candidate definition with prior art algorithms that perform inductions over data acquired in past user dialogs.

Various embodiments elicit user feedback by posing questions in dialogs. Various embodiments render candidate constituents and highlight relevant sub-constituents as questions are posed in dialogs. Examples of questions that may be posed to users include, but are not limited to, the following: must this constituent be present, must this constituent be taller/shorter, must this constituent have a wider/narrower border, must this text contain a certain substring. Alternative embodiments render candidate constituents with a graphical user interface such as those found in Web authoring tools, so that users can make changes to these candidates, with the changed constituents captured in markup according to prior art algorithms.

Various embodiments generate candidate definitions based from user feedback according to prior art learning and induction algorithms. Alternative embodiments generate candidate definitions by methodically altering previous candidates. Examples of alterations include, but are not limited to, inserting sub-constituents, deleting sub-constituents, moving sub-constituents within markup trees, repositioning sub-constituents within layouts, changing the sizes of sub-constituents, changing the graphical treatments associated with sub-constituents, changing texts. Other alternative embodiments combine induction algorithms with algorithms that methodically alter previous candidate definitions.

II. Information from Layout Structures

Embodiments of the present invention may use information derived from layout structures to supplement the parse trees associated with content. In particular, embodiments of the present information annotate nodes of the parse tree with measurement information. Measurement engine(s) 113 in FIG. 1 are modules that provide measurement information. For example, Web browser layout modules are measurement engines that are appropriate for content contained in Dynamic HTML (DHTML) files. For another example, a Web browser layout module supplemented by an XSLT processing module and an XSLT stylesheet may comprise a measurement engine that is appropriate to a class of XML documents.

Measurement information includes, but isn't limited to, width and height, horizontal and vertical position, length in characters (for texts), and size of referenced file (for images, videos, and so on). Some measurement information is readily available. Text lengths are apparent in the tree itself. Widths and heights may be specified as node attributes, in pixels or in other units. The size of a file can be obtained by downloading the file. However, other potentially useful measurement information requires non-trivial computation. For HTML files, browser rendering engines compute constituent dimensions and positions. While browser rendering engines mostly incorporate the same standards, they yield different measurement results in some cases. And some measurement results depend on such properties of the client device as screen resolution, window width, window height, and browser text size setting. These dependencies may be overt, as when a constituent width is specified (perhaps indirectly) as a percentage of window width. Scripts may affect constituent measurements.

In various embodiments, if the relevant modules of a browser rendering engine are available, these modules can be called as needed. Short of having an engine that fully incorporates DHTML rendering standards, lightweight modules can estimate constituent measurements. For example, the area of a text component may be roughly estimated based on font and text length. The measurement information that's most useful for content extraction purposes tends involve low-level constituents. To a great extent, measurements of these constituents are invariant, or vary relatively little, as client display parameters vary.

In addition, embodiments of the present invention may insert "virtual constituents" into parse trees. Some documents include constituents that are far apart in the parsed structure for the document, but near each other in the window (or printed page) when the document is rendered. For example, an HTML Web page may contain article text in a table cell, while a captioned image that's associated with the article is in a table cell belonging to a different table, with the two tables having no common ancestor below the body constituent, and with each of these two tables having multiple levels of ancestor intervening between it and the body constituent. Yet in this example, the captioned image is rendered to the immediate right of the article text. Embodiments of the present invention posit virtual constituents that contain constituents of the parse tree as sub-constituents. For the article example just described, an article constituent is posited that includes both the article text and the captioned image. Embodiments of the present invention insert virtual constituents into the parse tree under the root of the parse tree, or elsewhere. Sub-constituents of virtual constituents are then deleted from their original positions in the content tree. In alternative embodiments, immediate sub-constituents of virtual constituents retain their original parents in the parse tree. In these embodiments, virtual constituents are inserted in what becomes (if it is not already) a directed acylic graph that is not a tree, with some nodes having multiple parents.

Content descriptions that designate markup constituents and that include qualifications based on information from layout structures are prime examples of derived descriptions. The use of information from layout structures permits concise content descriptions that are relatively source-invariant and time-invariant, in cases where there are no concise or robust content descriptions that do not use information from layout structures. For example, both the professionals who create layouts and the general user population readily recognize captioned images as captioned images, but HTML does not include a tag for captioned images. Instead, Web designers create the effect of a captioned image in various ways using such HTML tags as TABLE, DIV, and SPAN, in addition to the IMG tag for the image itself, a text corresponding to the caption, and possibly other texts corresponding to image credits or other supplemental information. Server page technology makes it easy for a Web site to adopt a template for captioned images. Once this template is known, recognizing the site's captioned images is easy. However, even within one site, captioned images may correspond to different templates. The templates may correspond to very intricate markup trees. Templates are subject to unannounced revisions. Instances of a single template may incorporate variations, such as insertions and deletions of sub-constituents. Moreover, on some Web pages, captioned images appear which do not correspond to single nodes in Document Object Model (DOM) trees. For example, a table with three rows and three columns may be used to present two captioned images, with the images in the upper left and upper right cells, with the captions in the lower left and lower right cells, and with the middle row and middle column serving as spacers. The two captioned images correspond respectively to the left and right columns, which don't appear as constituents in the HTML source. A content request that's intended to draw captioned images from multiple Web sites, including previously unencountered Web sites, will be practically impossible to formulate without including layout-based specifications.

Captioned images can be characterized relatively straightforwardly using layout specifications. Captioned images may be fundamentally considered a layout category. A stereotypical captioned image comprises an image and a caption. A captioned image may also include one or possibly more additional short text constituents, such as a photo credit. An "ideal captioned image" for Web pages might be defined as comprising: (1) an image that measures at least 100 pixels wide and at least 100 pixels high; (2) a text, possibly including higher nodes such as HTML FONT and P and additional nodes such as HTML BR, that includes no more than 200 characters of text, and whose measured area is no more than half the measured area of the image; (3) optionally, an additional text that includes no more than 100 characters of text, whose measured area is no more than one eighth of the measured area of the image. The definition of "ideal captioned image" might further specify that the bottom edge of the image is positioned above the top edges of the texts, that the left edges of the texts are not positioned to the left of the left edge of the image, and that the right edges of the texts are not positioned to the right of the right edge of the image. This definition is certainly subject to refinement. Most of the specifics in the definition ("100 pixels," "200 characters," and so on) can be tuned. The definition can be expanded to encompass captioned images where the caption is above the image, and so on.

III. Distinguished Categories and Description Modifiers

Embodiments of the present invention may include the usage of "distinguished categories" and "description modifiers." In various embodiments, information concerning distinguished categories and description modifiers is recorded in category repository 110.

Distinguished categories, for ease of understanding, may be analogized to macros in programming languages. A content description may be designated as a distinguished category and assigned a name. Names of distinguished categories can themselves be heads of content descriptions. Let $category_1$ be the name of a distinguished category. When a content description $desc_2$ that contains $category_1$ is processed, $category_1$ is replaced by the content description $desc_1$ that the distinguished category designates, so that $desc_1$ becomes a nested content description within $desc_2$. If $desc_2$ is formulated so that a qualification $cond_1$ applies to $category_1$, and if $desc_1$ is defined as $category_2$ ($cond_2$), then $category_1$ ($cond_1$) in $desc_2$ is replaced by $category_2(cond_2\ \&\&\ cond_1)$. Distinguished categories may be defined recursively in terms of other distinguished categories. Hereafter, names of distinguished categories will be referred to simply as "distinguished categories." Extending the usage of "qualified description" from the narrow syntactic definition in paragraph 0041, distinguished categories that designate qualified descriptions are themselves examples of qualified descriptions. Distinguished categories that designate derived descriptions are themselves examples of derived descriptions.

For example, a distinguished category poster may be defined as an HTML image which when rendered in a window 1280 pixels wide has width between 600 pixels and 800 pixels, and height that's at least 1.5 times its width.

Description modifiers, for ease of understanding, may also be analogized to macros in programming languages. But where distinguished categories correspond to content descriptions and are analogous to common nouns, description modifiers correspond to qualifications and are analogous to adjectives. A description modifier may correspond to different qualifications, depending on which common category it modifies. For example, a description modifier large may be defined to apply to either Web pages or HTML table rows, so that a large Web page is one whose download (including referenced files) involves more than 1 megabyte, and so that a large table row is one that includes more than 10 child cells.

Distinguished categories and description modifiers may correspond respectively to arbitrarily complex content descriptions and arbitrarily complex qualifications. For example, captionedImage may be defined as a distinguished category, along the lines of the sketched definition of ideal captioned image in paragraph 0064. In various embodiments of the present invention, the defining content descriptions for distinguished categories, and the defining qualifications for description modifiers, may incorporate source specifications, markup string specifications, markup tree specifications, and specifications that derive from layout structures. In various embodiments of the present invention, the defining content descriptions, and the defining qualifications for description modifiers, may incorporate quantifiers and comparisons. For example, an "expository text" might be defined as a sequence of paragraphs, where the number of paragraphs exceeds a specified minimum, and where the total number of contained words exceeds a specified minimum. For another example, an "image-centric constituent" might be defined as a constituent that contains an image whose rendered area exceeds a specified minimum percentage of the rendered area of the constituent.

Embodiments of the present invention allow definitions of distinguished categories, and definitions of content description heads modified by description modifiers, to include expurgation specifications. Paragraph 0047 discusses expurgation specifications.

Embodiments of the present invention allow markup constituents to conform as a matter of degree to distinguished categories, or to conform as a matter of degree to content description heads modified by description modifiers. In some embodiments, qualifications within the definitions of distinguished categories and description modifiers that lie outside the scope of negation are assigned values between 0 and 1. By default, such qualifications are assigned values of 0. Values are calculated for higher constituents of content descriptions based on the form of the content description as given, with expansions of distinguished categories and description modifiers substituted in as defined—no normal forms are computed. Non-zero assigned values within the scope of negation are ignored. Non-zero assigned values within the scope of disjunction are ignored. If a conjunction itself has a non-zero assigned value, non-zero assigned values that lie within its scope are ignored. These ignored cases aside, if any qualification is false for a content constituent within a document, the value of the qualification is included in a product. This product corresponds to the degree to which the content constituent matches the content description. Embodiments of the present invention similarly annotate qualifications in content descriptions more generally, so that markup constituents may conform as a matter of degree to content descriptions that correspond neither to distinguished categories nor to content description heads modified by description modifiers.

Embodiments of the present invention organize distinguished categories into directed acyclic graphs based on the sub-category relationship. Sub-category relationships may be a matter of logical consequence, or a sub-category relationship between $category_1$ and $category_2$ may be stipulated based on an expectation that in the universe of deployed content, every content constituent that's a member of $category_1$ is also a member of $category_2$. Similarly, implication relationships among description modifiers (such as huge implying big) may be established based on logical or extensional grounds. Embodiments of the present invention may record distinguished categories, with their definitions and sub-category relationships, and description modifiers with their definitions and implication relationships, in a category repository 110.

In addition, embodiments of the present invention record in a category repository 110 definitions of sub-cases of distinguished categories and definitions of sub-cases of description modifiers. For example, it may be that all captioned images on a certain Web site derive from a simple HTML template and therefore correspond to a simple tree pattern. Further, it may be much more efficient to check for this pattern than to check for the general definition of captioned image. The content repository therefore records the simpler definition of captioned image and notes that it applies to documents from this Web site. Paragraphs 00125-00129 discuss such sub-cases. Embodiments of the present invention organize sub-cases as a directed acyclic graph according to the sub-case relationship.

Besides sub-category relationships among distinguished categories, and implication relationships among description modifiers, embodiments of the present invention use category repository 110 to record containment relations. For example, instances of the captionedImage category might contain instances of the image category, instances of the caption category, and instances of the imageCredit category. Embodiments of the present invention record in category repositories indications of which categories may correspond to independent content items. Various embodiments further record in content repositories how instances of distinguished categories are to be assembled and/or laid out for inclusion in display presentations, and similarly for instances of description heads modified by description modifiers. In various embodiments, records of assembly and layout instructions in category repositories are indirect. For example, these records may take the form of indexes into a lookup table. In various embodiments, assembly and layout instructions may include templates. In various embodiments, assembly and layout instructions may take the form of procedural code in languages such as C or JAVA™. Of course, assembly and layout instructions may introduce constituents that are not present in source markup. Records of containment relations may be especially helpful in cases where an instance of a distinguished category does not correspond to any constituent of source markup, as in the example discussed in paragraph 0063.

Embodiments of the present invention organize category repository 110 for rapid access according to methods of prior art. In various embodiments, category repository 110 may comprise an organization of sub-repositories.

A. Authoring

Distinguished categories and description modifiers can help mediate between content deployment details and human perspectives on content. Embodiments of the present invention elicit definitions of distinguished categories and description modifiers, whether from end users or information technologists or software developers, according to the iterative two-step process described in paragraphs 0054-0058. In the case of description modifiers, this two-step process elicits definitions of content description heads modified by description modifiers.

IV. Display Presentations of Content Aggregations

Embodiments of the present invention (e.g. content selection engine 116 and/or layout engine 117) may present extracted content for display. The embodiments vary according to the degree to which presented content is predetermined, and vary according to the degree to which the layout of display presentations is predetermined.

Concerning the determination of content to be presented, at one extreme users may compose ad hoc content requests and immediately submit them for processing. For example, a user might request captioned images from newspaper A such that the captions match president. At the opposite extreme, content requests are composed and fixed in advance, before these content requests are processed. When content requests are fixed in advance, and the requested content items vary over time (that is, when the content sources are dynamic), display presentations will vary depending on when the content requests are processed. Whether content requests are predetermined or not, users (in a broad sense of "user" that includes information technologists and developers as well as end users) may use procedural or non-procedural languages to compose content requests as discussed in paragraphs 0048, or they may use graphical user interfaces as discussed in paragraphs 0054-0058. Between the extremes of content predetermination, users may select content requests from repertories of content requests. Also between the extremes of content predetermination, users may be presented with incomplete or extensible content requests, and with an interface that allows them to complete or extend these content requests. A set of incomplete or extensible content requests may be fixed for use in its entirety, or may comprise a repertory from which users can select.

Concerning the determination of layout, at one extreme, displayed content items retain the layouts that are associated with the content items in their source documents. At an opposite extreme, displayed content items are forced into uniform, rigid layouts associated with the target display presentation, with constituents of content item deleted as necessary to ensure compatibility with these rigid layouts. At another opposite extreme, displayed content items may be subject to adaptive layout that allows content items, in combination with various other content items targeted to various display media, to have widely varying layouts. Some aspects of layout may be made uniform, while other aspects of layout are retained from source document layouts, and while some aspects of layout may be made subject to adaptive behavior. For example, widths and/or heights and/or aspect ratios may be made uniform, or may be constrained to fall within specified ranges. For another example, fonts and/or background colors and/or other types of graphic treatment may be made uniform.

Besides layouts within individual content items, if a display presentation encompasses more than one content item, then laying out the display presentation involves determining the relative layouts of the content items within the display presentation, and involves determining the graphic treatments of elements that are external to individual content items. At one extreme, content requests may be positioned within markup in much the same way that slots for dynamic content are positioned within server pages. Paragraphs 0082-0089 discuss such an embodiment. Then when a content item corresponding to a content request is retrieved, the markup corresponding to the content item simply replaces the content request in markup, and the markup is subsequently rendered in a Web browser, or in some other software program that renders markup. At an opposite extreme, the sizes and relative positions of content items, together with the sizes and relative positions of elements external to individual content items, and together with the graphic treatments of elements external to individual content items, may be subject to adaptive layout that is sensitive to combinations of content items, and/or is sensitive to display parameters.

Through its inclusion of content selection engine 116 and layout engine 117, and through its use of content constituent catalogs 115, the architecture described in paragraphs 0026-0036 supports the full range of alternatives described in paragraphs 0077-0080. Some of these alternatives may be supported by versions of the architecture that omit one or more the engines described in paragraphs 0026-0036.

A. Aggregate Pages and Aggregation Calls

Embodiments of the present invention use "aggregate pages" and "aggregation calls" to support presentation of content that is predetermined (modulo the dynamic nature of Web and other content) in layouts that are predetermined (modulo rendering in a Web browser or other software program that renders markup). Alternative embodiments use amalgams and extensions of the XPath family of proposed standards to support presentations of predetermined content in predetermined layouts. For example, link syntax might be extended so that links can incorporate fully recursive XQueries.

An "aggregate page" displays actual content, as opposed to links to content, from multiple sources. It includes one or more aggregation calls.

An "aggregation call" comprises a triple (CS, TP, PR) consisting of a content source (CS), a complex tree pattern (TP), and a procedure (PR). According to alternative embodiments of the present invention, an "aggregation call" comprises a triple (CS, PE, PR) consisting of a content source (CS), a path expression (PE), and a procedure (PR). The content source is a designation (such as a URI) for a file (such as an HTML file or an XML file) that contains a hierarchically structured document. The complex tree pattern will correspond to zero or more subtrees within the content source. Similarly, the path expression will correspond to zero or more subtrees within the content source. The procedure will return one or more trees. The procedure may include further aggregation calls among its sub-procedures. Note that the two definitions of aggregation call ((CS, TP, PR) vs. (CS, PE, PR)) are essentially equivalent. The definition with complex tree patterns will be used in the discussion that follows, but the definition with path expressions may be substituted throughout.

In what may be called the proper case, the procedure associated with aggregation call (CS, TP, PR) will return a tree that includes material from the subtrees of CS's document that match TP, or that includes material from subtrees reached via aggregation calls within PR. In what might be called the simple case, PR returns the single subtree of CS's document that matches TP.

By default, PR applies to at most one constituent of CS's associated document tree DC. Thus if DC contains multiple subtrees that match TP, one of these subtrees is effectively chosen at random as input to PR. The chosen subtree can be the first matching subtree encountered in a walk of DC. In the general case, PR can apply to the full set of matching subtrees. Aggregation calls can be supplied with a fourth member to indicate whether PR applies to a single matching subtree (as in (CS, TP, PR, +single)), or to the set of matching subtrees (as in (CS, TP, PR, −single)). In order to simplify the exposition that follows, it will be assumed that PR applies to a single subtree matching TP. Thus aggregation calls will be discussed as comprising triples, rather than quadruples.)

On the aggregate page, aggregation calls correspond to terminal nodes of the page's associated document. The procedure associated with an aggregate call on an aggregate page returns a single tree. When the page is processed for display, for each aggregation call (CS, TP, PR), the node corresponding to the aggregation call is replaced by the subtree that PR returns.

If aggregation calls $AC_1, \ldots, AC_n$ share the same content source CS, it almost certainly makes sense to download the content source once, rather than n times. The optimal tree walking strategy for CS's document DC will depend on n, on properties of DC, and on properties of the complex tree patterns $TP_1, \ldots, TP_n$ associated with $AC_1, \ldots, AC_n$. Paragraph 00137 describes a representative tree walking strategy.

In various embodiments, threading can be applied to the execution of aggregation calls. For example, different downloaded pages can be walked in different threads. For another example, procedures associated with different aggregation calls can be executed in different threads.

B. Content Items, Slots, and Content-shifting

Embodiments of the present invention associate content items with slots to display collections of predetermined content, and to shift content within slots and across slots. A "slot" may be a replaceable constituent within markup, or may be defined in terms of layout, whether as a region to be filled, or as a container to be filled. Slots may be structured recursively, as trees or as directed acyclic graphs, so that lower slots are constituents of higher slots.

Predetermined content may also be structured recursively, as trees or as directed acyclic graphs. A content organization tree (or directed acyclic graph) may be set up so that node proximity reflects semantic similarity, or similarity of medium, or similarity of source. Or the arrangement of a content organization tree (or directed acyclic graph) may be entirely arbitrary. Consider the following example of a content organization tree: the tree includes a node $N_1$ corresponding to news content. Among other nodes, $N_1$ directly dominates node $N_{1,1}$ corresponding to news commentary and node $N_{1,2}$ corresponding to news video clips. Among other nodes, $N_{1,1}$ directly dominates node $N_{1,1,1}$ corresponding to opinion columns. Among other nodes, $N_{1,1,1}$ directly dominates node $N_{1,1,1,1}$ corresponding to an opinion column from online newspaper A. $N_{1,1,1}$ also directly dominates node $N_{1,1,1,2}$ corresponding to an opinion column from online newspaper B. Video content deriving from newspaper A and video content deriving from newspaper B are positioned under node $N_{1,2}$. In this example, the content tree is organized independently of how the content is sourced. Content items from unrelated sources appear as sibling nodes in the tree. Content items from closely related sources are scattered around the tree.

It may be emphasized that content organization trees are distinct from the trees corresponding to parsed markup. The terminal nodes of content organization trees correspond to content items. If a content item is provided as parsable markup, then that content item has an associated markup tree.

Recursive content organization may be more or less dynamic. For example, if a content organization tree supports a user browser session, it may be permitted for user activity during the session to add nodes to the content organization tree, delete nodes from the content organization tree, and move nodes within the content organization tree. As an opposite extreme, a content organization tree might be fixed for an application, for all users, and for all user sessions.

Content may be cached on the client and on servers. In various embodiments, a primary server gathers content from diverse sources and then sends this content to clients. The primary server may be associated with a system of proxy servers where content is cached in anticipation of client requests.

Usability may be enhanced if content associated with a higher or lower content organization node is consistently associated with a single higher or lower slot. Users may be able to find content more easily if it's in an accustomed place. Embodiments of the present invention associate higher or lower content organization nodes with higher or lower slots. Such associations may or may not preserve the relative hierarchical levels of content organization nodes and slots. For example, terminal slots may be associated with preterminal content organization nodes, preterminal slots may be associated with pre-preterminal content organization nodes, and so on. Associations between content organization nodes and slots may be established by users, or by information technologists on behalf of users or groups of users, by means of suitable graphic interfaces, or the associations may be established by product developers. Embodiments of the present invention may record content organization structures, slot organization structures, and associations of content organization nodes with slot organization nodes, in a content aggregation specification repository 121. Content organization structures, slot organization structures, and associations of content organization nodes with slot organization nodes, may be, but need not be, particular to instances of content aggregations.

Content items have internal structures. Embodiments of the present invention assign layout rules to content associated with a slot, and assign content-shifting methods to content associated with a slot. For example, a text in English is laid out in lines, from left to right, and top to bottom. Various portions of a particular text may have various associated fonts. The text may be laid out with a certain number of columns. Standard typographical rules may apply to text layout, so that widows and orphans are avoided. If only part of a text is visible within a display, various methods may be provided for navigating the text. Scrollbars or other panning mechanisms may provide incremental forward or backward advancement through the text, where increments are defined in terms of display width and/or height. Analogs of book pages may be provided, so that users can advance forward or backward page by page. Tables of contents, indexes, search access, or even random access may be provided. The text may be presented in pages, with the possibility of advancing word by word, forward or backward, and/or with the possibility of advancing forward or backward by proportion of the total text. Forward and backward advancement that proceeds by increments of content may be termed "content scrolling."

Given that a preterminal content organization node N is associated with a terminal slot, embodiments of the present invention effectively construct a virtual content item from the content items that N dominates. This virtual content item may have an internal structure, may be associated with layout rules, and may be associated with content-shifting methods. For example, suppose that content organization node N dominates a set of captioned images. The set may be organized as a sequence, or as a sequence of sequences, among other possibilities. If the set is organized as a sequence of sequences, it may be associated with layout rules that call for the inner sequences to correspond to rows of a table, with captioned images in an inner sequence assigned to cells in order, from left to right. The outer sequence corresponds to the order of table rows, from top to bottom. Navigation in this example is by means of standard scrollbars. Alternatively, if the set of captioned images is organized as a sequence, it may be associated with layout rules that allow one captioned image to be displayed at a time, in its entirety. Content-shifting in this example is by means of buttons that provide forward and backward progression through the sequence.

When content items are sequenced and associated with forward and backward content-shifting through the sequence, the sequence may or may not be set up as a cycle, so that the first member of the sequence follows the last member, and so that the last member precedes the first member. Layout rules may or may not stipulate that a given content item can be rendered in no more than one region of the display at a time.

Display fit requirements may percolate top-down and/or bottom-up, limiting the amount of content that can be visible at one time in a slot. Requirements related to user information overload, or aesthetic considerations, may also limit the amount of content that can be visible at one time in a slot. If more content is assigned to a higher or lower slot than can be visible at one time, the slot is "overstuffed." In order for users to be able to eventually see all the content assigned to an overstuffed slot, they must use content-shifting methods associated with the slot.

Embodiments of the present invention operate recursively in bottom-up fashion over content organization trees (or directed acyclic graphs) to construct virtual content items from source content items and lower virtual content items. Higher virtual content items constructed from lower virtual content items may be assigned internal structures in the same way as virtual content items constructed from source content items. A slot paired with a higher virtual content item may be associated with layout rules and content-shifting methods in the same way as a slot paired with a virtual content item that's constructed from source content items. The layout of a virtual content item may respect the layouts of its constituent content items, or may override the layouts of its constituent content items. Layout specifications for virtual content items may include analogs of widows and orphans—stipulations of which constituents of virtual content items may not be stranded in layouts, in which ways. Content-shifting methods associated with higher virtual content items may or may not respect the content-shifting methods of lower content items.

As an example of recursive content organization and recursive assignment of source and virtual content items to slots, consider a virtual content item C of news commentary. C is assigned to a higher slot S that contains terminal lower slots $S_1$, $S_2$, and $S_3$. C derives from source content items that are organized as a directed acyclic graph. This graph has nine preterminal nodes, corresponding respectively to opinion columns from newspaper A ($C_{A1}$), editorial cartoons from newspaper A ($C_{A2}$), letters to the editor from newspaper A ($C_{A3}$), opinion columns from newspaper B ($C_{B1}$), editorial cartoons from newspaper B ($C_{B2}$), letters to the editor from newspaper B ($C_{B3}$), opinion columns from newspaper C ($C_{C1}$), editorial cartoons from newspaper C ($C_{C2}$), and letters to the editor from newspaper C ($C_{C3}$). All content is dynamic, deriving from the current editions of daily online newspapers. Each of the nine preterminal nodes in the content organization graph has two parents. $C_{A1}$, $C_{A2}$, and $C_{A3}$ are children of $C_A$, which corresponds to news commentary from newspaper A. $C_{B1}$, $C_{B2}$, and $C_{B3}$ are children of $C_B$, which corresponds to news commentary from newspaper B. $C_{C1}$, $C_{C2}$, and $C_{C3}$ are children of $C_C$, which corresponds to news commentary from newspaper C. $C_{A1}$, $C_{B1}$, and $C_{C1}$, are children of $C_1$, which corresponds to opinion columns. $C_{A2}$, $C_{B2}$, and $C_{C2}$ are children of $C_2$, which corresponds to editorial cartoons. $C_{A3}$, $C_{B3}$, and $C_{C3}$ are children of $C_3$, which corresponds to letters to the editor. $C_A$, $C_B$, $C_C$, $C_1$, $C_2$, and $C_3$ are children of C.

For each of the preterminal nodes in the content organization graph, the source content items assigned to the node are organized as a sequence. Thus the opinion columns assigned to $C_{A1}$, are organized as a sequence, and so on. Slot $S_1$ is associated with $C_1$, corresponding to opinion columns. Slot $S_2$ is associated with $C_2$, corresponding to editorial cartoons. Slot $S_3$ is associated with $C_3$, corresponding to letters to the editor. Content-shifting might be constrained so that higher slot S shows content from only one newspaper at a time, but for purposes of this example, assume that this is not the case. However, content-shifting for each of $S_1$, $S_2$, and $S_3$ is constrained so that each of these slots may show content from only one newspaper at a time. Further, $S_1$ can show all or part of one opinion column, but cannot show parts of more than one opinion column. $S_2$ must show exactly one editorial cartoon in its entirety. $S_3$ can show all or parts of one or more than one letter to the editor, with letters appearing one after the other according to assigned sequence. Layout in $S_1$ and $S_3$ respects fitting requirements, and also respects a policy against widows and orphans. $S_1$ is provided with the following nine content-shifting controls: (1a) move the current opinion column forward to the next full allotment of content (that is, page forward in the current opinion column), (1b) move the current opinion column backward to the previous full allotment of content, (1c) advance the current opinion column forward by one paragraph, (1d) advance the current opinion column backward by one paragraph, (1e) advance the current opinion column forward by one word, (1f) advance the current opinion column backward by one word, (1g) move to the next opinion column in sequence, (1h) move to the prior opinion column in sequence, (1i) move from opinion columns from newspaper A to opinion columns from newspaper B, or move from opinion columns from newspaper B to opinion columns from newspaper C, or move from opinion columns from newspaper C to opinion columns from newspaper A. (From a usability perspective, nine content-shifting controls for one slot may be excessive. This example illustrates a variety of representative controls.) $S_2$ and $S_3$ are provided with similar controls, consistent with their respective layout policies. In addition, S is provided with a content-shifting control that devotes S to content from newspaper A, or to content from newspaper B, or to content from newspaper C. If this control is used to devote S to content from newspaper A, then opinion columns from newspaper A appear in $S_1$, editorial cartoons from newspaper A appear in $S_2$, and letters to the editor from newspaper A appear in $S_3$. This control on S moves in sequence from $C_A$ to $C_B$ to $C_C$ and then back to $C_A$, or if S isn't currently devoted to any of $C_A$, $C_B$, or $C_C$, this control devotes S to $C_A$.

According to embodiments of the present invention, content-shifting within content slots may proceed in tandem. For example, extending the example in paragraphs 00101-00102, S may be provided with a content-shifting control that advances forward to the next full allotment of content in each of $S_1$, $S_2$, and $S_3$, with a full allotment for $S_1$ and $S_3$ determined according to fitting requirements and according to the layout display policies described in paragraphs 0096-0097, and with a full allotment of content for $S_2$ as a single editorial cartoon in its entirety. Tandem content-shifting may involve any number of (content item, slot) pairs, where content items may be source content items or virtual content items, and where slots may be at the same or at different levels within the slot organization structure.

Embodiments of the present invention allow content aggregations to be authored with flexible slot structures, so that the precise slot structure to be employed to present the aggregated content may be determined/selected, at request time, or thereafter, based on user activity or other activity. In various embodiments, slots may be added or deleted, and the organization of slots into a tree or directed acyclic graph may change. In various embodiments, slots may be activated or deactivated, and parent-child relationships may be activated or deactivated in a tree or directed acyclic graph of slots. In various embodiments, properties of slots, such as position and dimensions, may change. In various embodiments, user activities that trigger changes to slot organization and to slot properties may be intermingled in time with user activities that navigate content. In various embodiments, user controls for slot changes may be intermingled in a user interface with user controls for content-shifting. Embodiments of the present invention allow the associations of content with slots to change, based on user activity or other activity. In various embodiments, user activities that trigger changes in content-slot associations may be intermingled in time with user activities that navigate content. In various embodiments, user controls for content-slot association changes may be intermingled in a user interface with user controls for content-shifting. Embodiments of the present invention thus provide for user interfaces where content-shifting intermingles with authoring.

For example, suppose that it's desired to display a content aggregation on a mobile device, while minimizing downloads and minimizing scrolling. All but a very small number of slots are de-activated. Only content that's reached by user content-shifting is downloaded. For large content items that can be divided into independently displayable chunks, such as texts, chunks are displayed according to fit and other requirements. Controls are provided that allow the user to shift content, as described in paragraphs 0090-00104. Controls are also provided that allow the user to activate and deactivate slots. If the user wishes to display content that is assigned to a currently deactivated slot S, he or she can deactivate a currently activated slot, and activate S to take its place.

With the mechanisms described in paragraphs 0090-00105, embodiments of the present invention allow a Web site publisher/provider to set up one or more than one version of a site as a content aggregation that includes content-shifting controls, where the content-shifting controls may be intermingled with authoring controls. Servicing for controls may be provided through a client application, through a Web service, through a client Web browser plugin, through a script downloaded to the client Web browser, through an application service provider, through a content management system, or through a Web browser itself.

Embodiments of the present invention delay the download of content items until user content-shifting activity triggers the download of these content items. In various embodiments, download triggers may be placed directly on source or virtual content items, so that the content belonging to the content items is downloaded only if the items initially appear in slots, or only if the items are shifted to appear in slots. In various embodiments, download triggers may be associated with higher content organization nodes, so that once a source or virtual content item underneath a content organization node appears in some slot, all the other content that the content organization node dominates is also downloaded. Delayed downloads are especially useful in the case where content is deployed to a mobile device.

Embodiments of the present invention may record content-shifting specifications/controls, together with any intermingled authoring controls, in a content aggregation specification repository 121. Content-shifting specifications/controls, with or without intermingled authoring controls, may be, but need not be, particular to individual content aggregations.

C. Example of a Personalized Aggregation of Web Content

Figure 2:
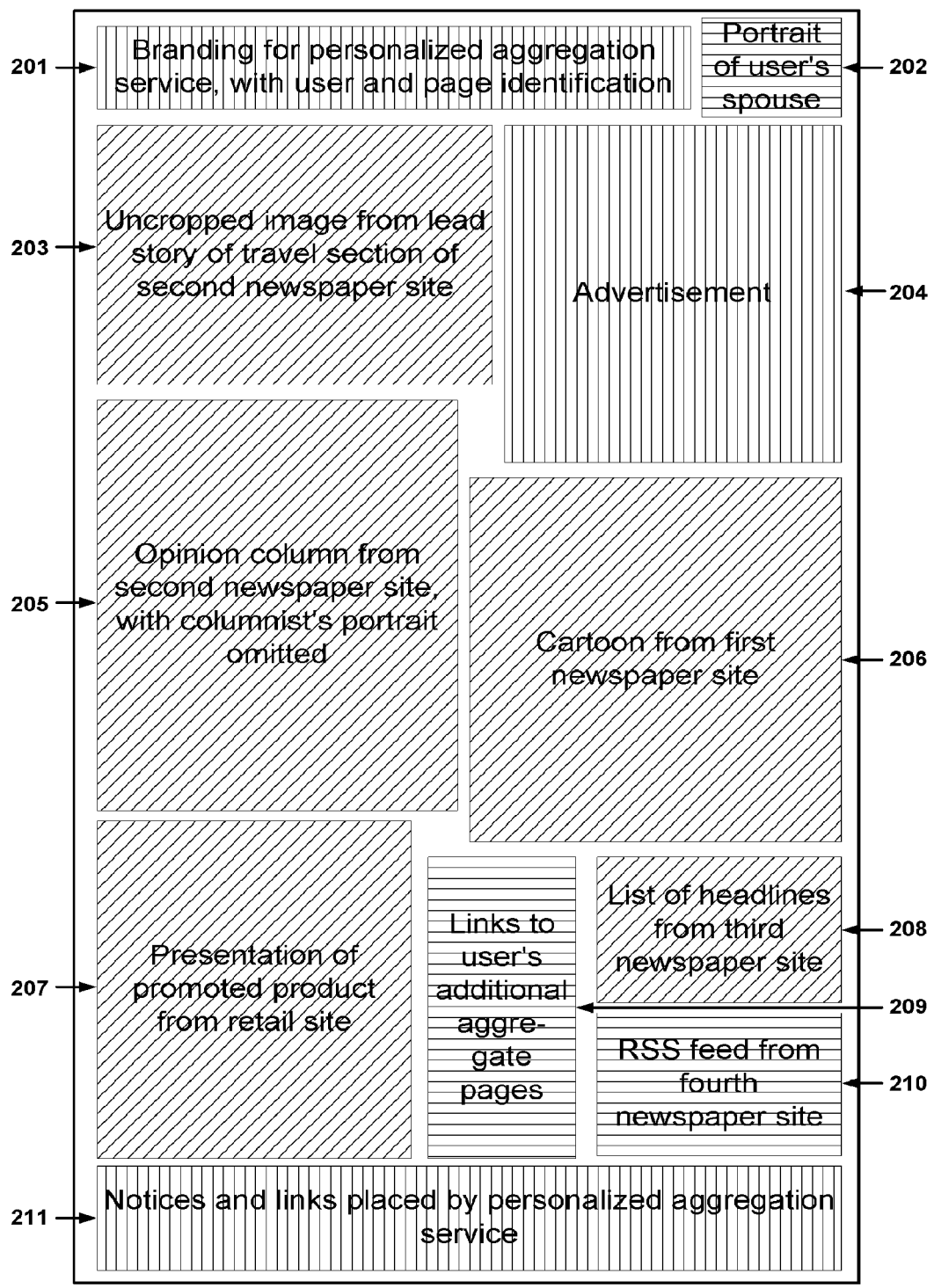
FIG. 2 illustrates an example display page that displays a personalized aggregation of Web content.

FIG. 2 illustrates a Web page that displays a personalized aggregation of Web content. This illustrative example may be implemented in accordance with various embodiments of the present invention, such as the embodiments described in paragraphs 0082-0089. For purposes of the illustration, it's assumed that an application service provider services this aggregate page. Constituents with vertical hatching ("Branding for personalized aggregation service, with user and page identification" 201, "Advertisement" 204, "Notices and links placed by personalized aggregation service" 211) are placed at the option of the application service provider, with the explicit or implicit concurrence of the user. Constituents with horizontal hatching ("RSS feed from fourth newspaper site" 210, "Portrait of user's spouse" 202, "Links to user's additional aggregate pages" 209) are placed at the option of the user, by means available in prior art that do not involve the personalized aggregation of Web content. Constituents with diagonal hatching ("Cartoon from first newspaper site" 206, "Opinion column from second newspaper site, with columnist's portrait omitted" 205, "Uncropped image from lead story of travel section of second newspaper site" 203, "List of headlines from third newspaper site" 208, "Presentation of promoted product from retail site" 207) are placed at the option of the user and are serviced through means of the present invention. (Note that these constituents have been chosen to concisely illustrate a variety of possibilities. There's no implication that this particular selection of constituents is likely to correspond to what any user wants on his/her aggregate page.)

"Cartoon from first newspaper site" corresponds exactly to a constituent on a page from the first newspaper site. The tree returned by the procedure associated with the corresponding aggregation call is a simple copy of the entire constituent, including an img node with src attribute set to a file on the first newspaper site.

"Opinion column from second newspaper site, with columnist's portrait omitted" corresponds to a constituent on a page from the second newspaper site. The procedure PR associated with the corresponding aggregation call includes an embedded aggregation call, which returns the constituent within the opinion column that presents the columnist's portrait. PR returns a copy of the opinion column, but with the constituent corresponding to the columnist's portrait deleted.

"Uncropped image from lead story of travel section of second newspaper site" involves three constituents on three different pages from the second newspaper site. Servicing this constituent follows three levels of aggregation calls. The outermost aggregation call ($CS_1$, $TP_1$, $PR_1$) is on the aggregate page itself. $CS_1$, is the main page for the newspaper travel section. $TP_1$, matches a link $LN_1$, to the lead story of the travel section. $PR_1$, includes aggregation call ($CS_2$, $TP_2$, $PR_2$), where $CS_2$ is the page containing the lead story. $PR_1$, specifies $CS_2$ on the basis of $LN_1$. The lead story page includes images, where each image includes a link to a high-resolution uncropped version of itself, presented on a separate page. $TP_2$ matches $LN_2$, the link to a separate page $CS_3$ with a high-resolution uncropped version of the story's first image. $PR_2$ includes aggregation call ($CS_3$, $TP_3$, $PR_3$). $PR_2$ specifies $CS_3$ on the basis of $LN_2$. $TP_3$ matches the high-resolution uncropped image. $PR_3$ returns a copy of the image constituent, including its caption and including an img node with src attribute set to a file on the second newspaper site. $PR_2$ and $PR_1$, return this same tree in turn.

"List of headlines from third newspaper site" is similar to an RSS feed insofar as comprises descriptive links to articles on a newspaper site. It's different from an RSS feed insofar as it's personalized in detail, insofar as its generation doesn't involve existing link constituents, insofar as its listed content items don't correspond to individual pages, and insofar as clicking on any of its elements doesn't lead to presenting a new page in a browser window. For purposes of illustration, this particular list comprises descriptive links corresponding to the first two headlines from the national section of the newspaper site, descriptive links corresponding the first two headlines from the international section of the newspaper site, and a descriptive link corresponding the first headline from the entertainment section of the newspaper site that includes the word "piano," if there is any such headline. The third newspaper site presents each of its sections as a single page containing multiple articles. The site contains no link constituents corresponding to articles. On the aggregate page, each link to the third newspaper site corresponds to a separate aggregation call. Briefly, the links are generated by matching the headline constituents within the articles themselves. Generating the entertainment link involves searching headline strings for the word "piano." The generated links are not standard links to pages. Instead, they reference aggregation calls. When one of the generated links is clicked, a copy of the tree corresponding to the chosen story is returned. For purposes of this example, it's assumed that the aggregate page has been set up so that when one of the links is clicked, the corresponding story replaces whatever currently fills the page position initially occupied by the opinion column from the second newspaper site.

"Presentation of promoted product from retail site" corresponds exactly to a constituent on a page from a retail site chosen by the user. The tree returned by the procedure associated with the corresponding aggregation call is a simple copy of the entire constituent subtree, including two img nodes with src attributes set to files on the retail site.

D. Example of a Content Aggregation for a Mobile Device, with Content-Shifting

Figure 3:
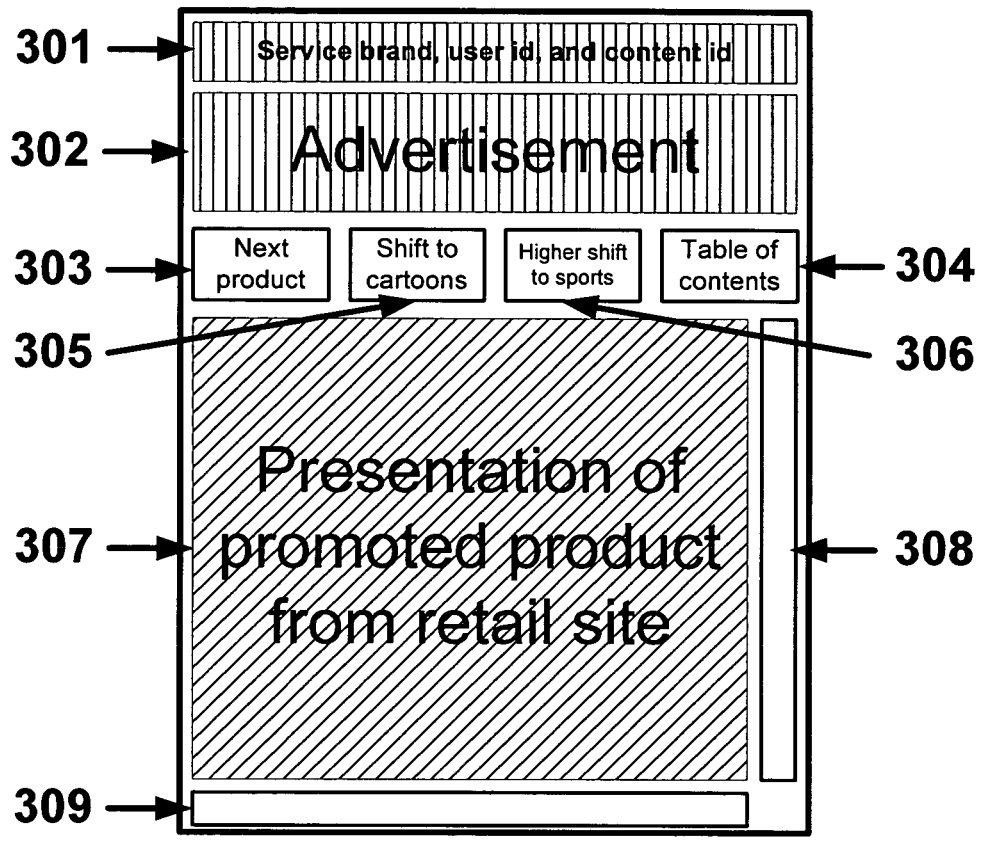
FIG. 3 illustrates an example display that displays a personalized aggregation of Web content that is intended for a mobile device and that features content-shifting.

FIG. 3 illustrates a display presentation of a personalized aggregation of Web content that shares content with the personalized aggregation of Web content that's illustrated in FIG. 2. Unlike the Web page illustrated in FIG. 2, this display presentation is intended for a mobile device. And unlike the Web page illustrated in FIG. 2, this display presentation features content-shifting. This illustrative example may be implemented in accordance with various embodiments of the present invention, such as the embodiments described in paragraphs 0090-00108. For purposes of the illustration, it's assumed that an application service provider services this display presentation.

The display presentation shown in FIG. 3 is based on a simple content organization tree. The root of this tree (C) has five children. The leftmost child of C ($C_1$) is preterminal and has one child, corresponding to a content item comprising notices and links placed by a personalized aggregation service. This content item under $C_1$ has content similar to the content 211 in FIG. 2. When the user connects to the personalized aggregation service, the initial display presentation shows the content item under $C_1$, together with branding, user id, and content id information. The remaining four children of C correspond to four personalized content aggregations, each corresponding to a category of subject matter identified by the user. $C_2$ dominates a variety of content items, with news commentary as the dominant theme. $C_3$ has sports news as the dominant theme, $C_4$ has technology news as the dominant theme, and $C_5$ has business news as the dominant theme. $C_2$ has eight children, corresponding respectively to images with presumed aesthetic appeal ($C_{2,1}$), opinion columns ($C_{2,2}$), editorial cartoons ($C_{2,3}$), promoted product presentations($C_{2,4}$), lists of headlines from various newspapers ($C_{2,5}$), RSS feeds from various newspapers ($C_{2,6}$), and a portrait of the intended user's spouse ($C_{2,7}$). Each of $C_{2,1}$-$C_{2,4}$ dominates a sequence of source content items that derive from newspaper Web sites. $C_{2,5}$ dominates a sequence of lists of headlines, where each list of headlines is similar to the list of headlines described in paragraph 00113. $C_{2,6}$ dominates a sequence of RSS feeds. $C_{2,7}$ dominates a single image of the user's spouse.

The display presentation shown in FIG. 3 includes a horizontal scrollbar 309 and a vertical scrollbar 308. It also includes service brand, user id and content id 301, an advertisement 302 and four content-shifting controls 303-306. It includes exactly one slot (S) 307 devoted to the content in the content organization tree $C_2$. During the course of the user's interaction with this display presentation, advertisement 302 may be replaced by other advertisements that correlate with displayed content, or with the history of displayed content, or with content in C more generally, or with a user profile. With S 307 currently assigned $C_{2,4}$, S shows all or part of one content item at a time. Because just one content item is shown in this slot, required scrolling is limited. Other methods, such as image and font reductions, and subdivision of text constituents into display pages, may be used in conjunction with the methods of the present invention to eliminate scrolling entirely The leftmost control in FIG. 3 303, is labeled as "Next product" in FIG. 3, reflecting the current assignment of $C_{2,4}$ to S. As this button is pressed, the content items dominated by $C_{2,4}$ are displayed in turn, one at a time. If the button is pressed when the last content item dominated by $C_{2,4}$ is replaced, then that content item is replaced in the display by the first content item dominated by $C_{2,4}$. The second control from the left 305 reflects the current assignment of $C_{2,4}$ to S. When this button 305 is pressed, it shifts content from $C_{2,4}$ to $C_{2,5}$. This button 305 operates at the next highest level of the content tree. When it 305 is pressed, the text on the leftmost button 303 is relabeled as "Next headlines," and this button 303 then serves to cycle the content dominated by $C_{2,5}$ through S. The second control from the left 305 cycles content from $C_{2,1}$ to $C_{2,2}$ to $C_{2,3}$ to $C_{2,4}$ to $C_{2,5}$ to $C_{2,6}$ to $C_{2,7}$ and back to $C_{2,1}$. The third button from the left 306 is similar, but cycles content at a yet higher level of C, from $C_1$ to $C_2$ to $C_3$ to $C_4$ to $C_5$ and then back to $C_1$. The rightmost button 304 in FIG. 3 leads to a graphic representation of the entire content tree C, with nodes corresponding to content links.

E. Content Constituent Catalogs

Embodiments of the present invention support what may be called "constituent integrity" as a criterion for selecting content constituents. An "integral constituent" is more than the sum of its parts. In an integral constituent, the juxtaposition of sub-constituents adds to the meanings conveyed by the individual sub-constituents. To take a very simple example, consider an HTML product description that comprises the product name in one table cell, and the product price in another table cell. It's the juxtaposition of these two cells that conveys the information that this product has this price. Texts such as news articles and essays, or for that matter, novels and poems, are prime examples of integral constituents. So are comic strips. Integral constituents can be sub-constituents of other integral constituents. For example, a captioned image is an integral constituent that's a sub-constituent of a news article, which is also an integral constituent.

Constituent integrity may be a matter of degree, and ultimately, a matter of individual perception. There are nevertheless clear-cut contrasts among constituents in this respect. For example, a single news article is readily perceived as an integral constituent, even if it's split across multiple Web pages. In contrast, a constituent that's assembled from unrelated smaller constituents, or assembled from marginally related smaller constituents, is less readily perceived as integral. For example, an HTML table that includes a news article, lists of links to other articles, and advertisements may be very apparent visually when the containing page is rendered, but not readily perceived as an integral constituent. Some integral constituents retain all or most of their perceived integrity when certain of their sub-constituents are expurgated. (Thus the term "constituent integrity" is based on an imperfect metaphor.) For example, the text of a news article may include an embedded advertisement that can be expurgated and delivered separately from the news article without reducing the total information conveyed.

For some simply specified constituent categories, characteristics related to constituent integrity are fairly immediate. For example, paragraphs readily combine to form higher integral constituents. In the absence of full information about constituent integrity, some general principles can be used to infer with more or less confidence which constituents are integral. For example, the lowest ancestor constituent of a header constituent that meets one of (or better yet both) of the following two tunable conditions is likely to be integral: (1) the total amount of text contained in the higher constituent is much greater than the total amount of text contained in the header; (2) the rendered area of the higher constituent is much greater than the rendered area of the header. If the header constituent is rendered at the top of the higher constituent, that increases the likelihood that the higher constituent is integral. To take another example of inference of constituent integrity, a constituent is unlikely to be integral if it contains a large number of similar complex integral constituents, where these contained constituents are not known to be possible sub-constituents of higher integral constituents.

Embodiments of the present invention apply constituent integrity as a secondary filter in determining which constituents to include in display presentations. According to these embodiments, given a content request, and given content fragments that satisfy the content request, content fragments with greater degrees of constituent integrity are more highly preferred.

Embodiments of the present invention organize extracted content into an annotated catalog of content constituents, as illustrated in FIG. 1 ("content constituent catalog" 115). Annotations may include, but are not limited to, rendered size, constituent integrity, and degree to which a constituent corresponds to a specified content request. Annotations may also include indications of which sub-constituents of a constituent corresponding to a content request are candidates for expurgation. And annotations may include assignments of content constituents to a content organization tree (or directed acyclic graph).

Embodiments of the present invention direct content constituent catalogs to a content selection engine (116 in FIG. 1) that trades off among various content selection criteria to determine which content constituents to present in response to a content request, and possibly to determine the order in which content constituents will be presented. In some of these embodiments, the content selection engine communicates with a layout engine (117 in FIG. 1). As the layout engine places content constituents according to layout criteria, it may generate very specific requirements that it can communicate to the content selection engine. For example, a layout in progress may have room for a constituent of a specific size. The layout engine can request a constituent of this size from the content selection engine, which can then supply the constituent of the required size that best satisfies the selection criteria in effect.

V. Pre-Request-Time Optimizations

A. Empirical Optimization

Suppose that a user content request for captioned images is applied to a particular newspaper ("newspaper A"), possibly in the course of applying this request to multiple document sources. Suppose further that the content request includes the distinguished category captionedImage, and that this distinguished category is defined using information from layout structures, as in paragraphs 0059-0064. Suppose further that captioned images in newspaper A can be characterized in terms of simple markup properties. For example, captioned images in newspaper A might correspond to exactly those HTML DIV constituents with value CAPTIONEDIMAGE for the CLASS attribute. It may be assumed that it's computationally cheaper to look for DIV constituents with value CAPTIONEDIMAGE for the CLASS attribute, than it is to look for constituents that satisfy the definition sketched in paragraph 0064. Not only is the definition in terms of node labels and node attribute values simpler in this case, but looking for constituents that satisfy it doesn't require rendering. When extracting captioned images from newspaper A, replacing the general definition of captioned image with the simpler definition is a worthwhile optimization, especially if there is no independent reason to render pages from newspaper A.

While a developer or information technologist might refine the definition of captionedImage for newspaper A, so that the optimized definition is available in the category repository, this kind of optimization is highly labor intensive for humans. The optimization depends upon the vagaries of how documents have been authored for various sources. These optimizations are empirical. The peculiarities of authoring must be observed, recorded, and tested. Ideally, optimizations will be noted for many distinguished categories, description modifiers, and content descriptions, over many document sources. In general, document sources must be classified more finely than just according to Web site or document database. For example, captioned images in newspaper A might have different markup characteristics depending on whether the captioned images derive from articles in the news section or articles in the entertainment section.

Embodiments of the present invention derive empirical optimizations automatically. Prior art Web crawling methods may be used to gather Web documents for examination. Documents in databases and file systems may be systematically examined. Taking the case of distinguished categories as representative, each document of interest is examined for instances of each distinguished category of interest. Hypotheses are generated concerning simple characterizations of distinguished categories. For example, does each instance of a distinguished category in a class of documents share an identifier (in the case of HTML, does each instance have the same value for the ID attribute)? For another example, does each instance of a distinguished category in a class of documents share a node label? For another example, does each instance of a distinguished category in a class of documents share an (attribute, value) pair? For another example, does each instance of a distinguished category in a class of documents have the same simple path (as in "first DIV child of second TD child of third TR child of first TBODY child of first TABLE child of first BODY child of HTML document root") to the root node of the containing document? Does each instance of a distinguished category satisfy some conjunction of conditions similar to these, and do all the constituents that satisfy the conjunction instances belong to the distinguished category?

For some document sources, each document from the source includes what may be called "reference nodes." For example, it may be that for every HTML news article from newspaper A, editorial content is entirely contained in a table cell that's six levels below the BODY node in the article's DOM tree. Content requests that target editorial content from newspaper A's news articles can use paths that begin at this table cell, rather than beginning at the document root, with a consequent improvement in request-time efficiency. Embodiments of the present invention generate hypotheses concerning reference nodes. Candidates include nodes that dominate large subtrees, nodes that dominate constituents of interest, nodes that correspond to large regions when the document is rendered, and nodes that correspond to regions that include the regions corresponding to constituents of interest. When one candidate reference node includes another, and the two candidate nodes' corresponding regions differ only slightly in area, one or the other candidate node may be preferred on that basis.

Given mechanisms as described in paragraphs 00125-00128 for generating sets of hypotheses concerning a simple characterization of a distinguished category, or concerning a simple characterization of a description modifier, or concerning a simple characterization of a content description or a content description fragment, or concerning a characterization of a reference node, embodiments of the present invention employ prior art learning and induction algorithms to determine which hypotheses are valid. Embodiments of the present invention employ prior art optimization metrics to determine which valid hypotheses are preferred.

B. Content Fragment Caches

Embodiments of the present invention (e.g. content request engine 111) may cache content items associated with content aggregations, cache documents and content fragments that contain items associated with content aggregations, and cache content fragments that are properly contained in content items associated with content aggregations. Content fragment caches appear as 119 in FIG. 1. As discussed in paragraphs 0074, content fragments that are properly contained in content items may be associated with assembly and/or layout instructions. Various embodiments assemble and/or layout these content fragments into content items, prior to caching them. Depending on the dynamic nature of the content fragments in question, these caches may be updated on a daily or other periodic basis. As the demand for a content item or content fragment increases, and as the update period decreases, such caching offers increasing advantages.

Embodiments of the present invention organize content fragment caches 119 for rapid access according to methods of prior art.

C. Annotations on Cached Documents

Embodiments of the present invention annotate documents before these documents are cached (e.g., in content fragment caches 119), so that nodes that correspond to distinguished categories, or that satisfy description modifiers, or that correspond to content requests or content descriptions of interest, or that correspond to reference nodes, are marked accordingly. The annotation process involves examining the documents for instances of distinguished categories, and so on, and may require rendering. The advantage is that this examination can take place before users request content. At content-request-time, examining documents for annotations will generally offer efficiency advantages over examining documents for content based on content descriptions.

Various embodiments provide an additional form of annotation for document nodes that correspond to instances of distinguished categories that are properly contained in content items. This additional form of annotation allows instances of content fragments to be correctly matched together in assembling content items. For example, if a document contains two instances of the captionedImage distinguished category, assembled respectively from two instances of the image category and two instances of the caption category, this additional annotation allows the image instances to be associated with the correct caption instances. In various embodiments, this additional form of annotation takes the form of a numerical "instance index." Note that a constituent might serve as a sub-constituent of more than one instance of a distinguished category, or of instances of more than one distinguished category.

Embodiments of the current invention also render cached documents in advance of request-time, and then annotate the documents with information from layout structures, such as the widths, heights, x-positions, and y-positions of document constituents. In various embodiments, these annotations indicate measurements from multiple diverse measurement engines. In various embodiments, these annotations indicate measurements that reflect multiple diverse sets of client display parameters. While parsing is relatively cheap computationally, various embodiments of the present invention cache documents' parse trees.

D. Other Pre-Request-Time Optimizations

The compiler, database, and XML research and development communities have originated a large body of optimization techniques that may be adapted to pre-request-time processing of content descriptions and content requests.

VI. Request-Time Optimizations

When content is requested, it's desirable to avoid repeated downloads of a single document. It's also desirable to avoid repeated renderings of a single document, repeated parses of a single document, and repeated walks of a single document parse tree or parse tree fragment. When walking a document parse tree or parse tree fragment to find instances of tree patterns, it's desirable to minimize the number of patterns being sought at any point during the walk. Even with the pre-request-time optimizations discussed in paragraphs 00125-00134, there's ample scope for request-time optimizations.

Various research and development communities have originated applicable request-time optimization techniques. In particular, the compiler research and development community has originated applicable tree-pattern-matching techniques. Embodiments of the present invention (e.g. content extraction engine(s) 123) may incorporate/adapt one or more of these various techniques.

Figure 4:
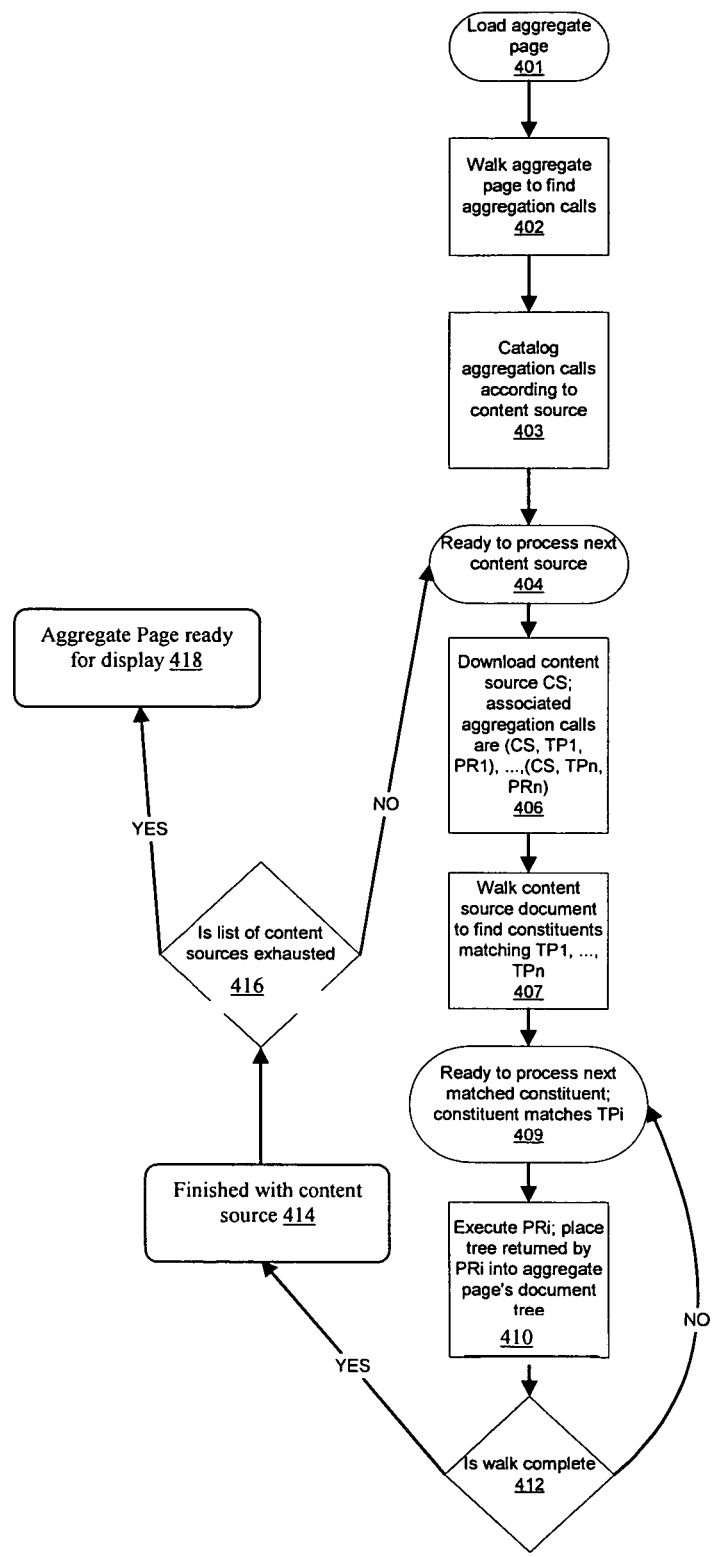
FIG. 4 illustrates a procedure for constructing a display page that displays a personalized aggregation of Web content, in accordance with various embodiments.

FIG. 4 depicts a representative request-time algorithms associated with the present invention, in accordance with various embodiments. This representative algorithm applies to an aggregate page. It uses a single thread to execute operations, in response to a request to load an aggregate page 401, as follows: Walk the entire aggregate page in preorder, accumulating the full set of aggregation calls on the page 402. Catalog the aggregation calls according to content source 403. For each content source (when ready 404), download the content source 406 and walk the associated document in preorder 407-412. Let $\{(CS_i, TP_{i_1}, PR_{i_1}), (CS_i, TP_{i_2}, PR_{i_2})\}$ be the set of aggregation calls associated with this content source 407. During the walk of $CS_i$'s document 407-412, for each $TP_{i_j}$ (when ready 409), maintain a check for $TP_{i_j}$ a subtree matching $TP_{i_j}$ encountered. (More precisely, maintain checks for contextual tree patterns from the $TP_{i_j}$ and maintain a record of which contextual tree patterns are satisfied at the current position in the walk. Maintain checks for the second members of the $TP_{i_j}$ whose contextual tree patterns are currently satisfied.) When a subtree matching $TP_{i_j}$ encountered, execute $PR_{i_j}$ 410. (If $PR_{i_j}$ includes aggregation call (CS', TP', PR'), check whether CS' is cached. If CS' is not cached, download it and cache it. Execution of embedded aggregation calls is eager, so that if a document is associated with multiple embedded aggregation calls, it will be walked multiple times.) Use the tree returned by $PR_{i_j}$ to replace the corresponding aggregation call node in the aggregate page. When the walk is complete (yes branch of 412), the algorithm continues to operation 414 to determine if it is finished with the content source, else (no branch of 412), the algorithm returns to operation 409. When content from each content source has been walked 416, the aggregate page is ready for display 418.

VII. Computing Device Architecture

Figure 5:
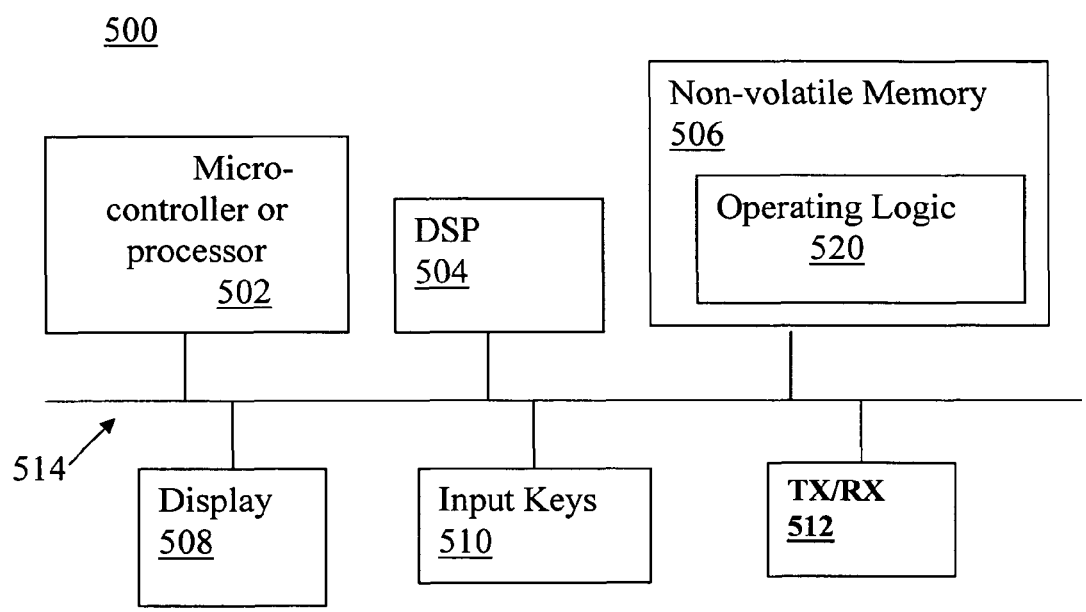
FIG. 5 illustrates an example computer system, suitable for use to facilitate practice of the present invention, in accordance with various embodiments.

FIG. 5 illustrates an architecture view of a computing device 500, such as a desktop computer or a mobile device (such as a mobile phone or a personal digital assistant (PDA)), suitable for practicing the present invention in accordance with one embodiment. Computing device 500 may be a server or a client. Whether as a server or client, computing device 500 may be coupled to clients or server via a wireless or wireline based interconnection, over one or more private and/or or public networks, including the famous public network "Internet".

As illustrated, for the embodiment, computing device 500 includes elements found in conventional computing device, such as micro-controller/processor 502, digital signal processor (DSP) 504, non-volatile memory 506, display 508, input keys 510 (such as 12 key pad, select button, D-unit), and transmit/receive (TX/RX) 512, coupled to each other via bus 514, which may be a single bus or an hierarchy of bridged buses. Further, non-volatile memory 506 includes operating logic 520 adapted to implement all or selected aspects of the earlier described content aggregation technologies. The implementation may be via any one of a number programming languages, assembly, C, and so forth.

Except for their support of the content aggregation technologies of the present invention, the functions and constitutions of the various enumerated elements of FIG. 5 are known in the art, accordingly will not be otherwise further described either.

In alternate embodiments, all or portions of the described content aggregation technologies may be implemented in hardware, firmware, or combination thereof. Hardware implementations may be in the form of application specific integrated circuit (ASIC), reconfigured reconfigurable circuits (such as Field Programming Field Array (FPGA)), and so forth.

What is claimed:

1. A computing device implemented method comprising:
receiving, by a computing device, a request to generate and return a content aggregation, wherein the content aggregation to be generated is to include a plurality of content constituent parts to be selected from a plurality of electronic documents, wherein the request includes or references a content aggregation specification specifying the content aggregation to be generated, wherein the content aggregation specification includes a plurality of directives characterizing the content constituent parts to be selected for inclusion into the content aggregation to be generated, wherein the directives characterize the content constituent parts to be selected in terms of a plurality of layout-based descriptions, wherein each layout-based description incorporating a layout qualification to be analyzed against a layout of an electronic document to determine whether the electronic document includes qualifying content constituent parts to be selected for inclusion into the content aggregation to be generated and returned;
obtaining or causing to be obtained, by the computing device, the content constituent parts, from a plurality of electronic documents having content constituent parts meeting selective ones of the layout qualifications of the layout-based descriptions of the directives of the content aggregation specification of the request; and
responding or causing to be responded, by the computing device, to the request with the requested content aggregation having obtained layout qualification meeting content constituent parts selected from the electronic documents in accordance with the directives of the content aggregation specification of the request.

2. The method of claim 1, wherein said receiving comprises receiving the request from a client device coupled to the computing device, the client device being one of a server, a desktop computing device or a mobile computing device, and the responding or causing to be responded comprises providing the obtained layout qualification meeting content constituent parts to the client device.

3. The method of claim 1, wherein at least one of the obtained layout qualification meeting content constituent parts comprises text, graphics, an image, one or more video frames, or an audio clip.

4. The method of claim 1, wherein the content aggregation specification comprises a distinguished category name specifying at least a subset of the directives.

5. The method of claim 1, wherein at least one of the directives characterizes a content constituent part in terms of one or more layout qualifications expressing one or more layout attributes of the content constituent part.

6. The method of claim 5, wherein at least one of the layout qualification is a presentation size, a presentation length, a presentation width, a presentation height, a number of presentation pixels or a number of presentation characters of the content constituent part when the content constituent part is rendered.

7. The method of claim 1, further comprising the computing device in facilitating a user in creating the content aggregation specification having the directives characterizing the content constituent parts in terms of layout-based descriptions with layout qualifications.

8. The method of claim 1, further comprising processing or causing to be processed, by the computing device, the content aggregation specification including the layout qualifications of the layout-based descriptions of the directives, to identify the content constituent parts.

9. The method of claim 8, wherein at least one of the directives comprises a description modifier modifying a layout-based description, and the method further comprises the computing device processing or causing to be processed the description modifier, contextually interpreting the description modifier based at least in part on the layout-based description the description modifier modifies.

10. The method of claim 8, wherein the processing by the computing device includes accessing by the computing device a layout-based description repository or a content category repository for information associated with one or more layout-based description terms or one or more layout-based description categories respectively, to assist the computing device in processing the received content aggregation specification.

11. The method of claim 1, further comprising:
receiving by the computing device, the plurality of content constituent parts; and
organizing or causing to be organized, by the computing device, the received layout qualification meeting content constituent parts for presentation, using a plurality of display slots, including recursively organizing at least some of the layout qualification meeting content constituent parts, and associating the recursively organized layout qualification meeting content constituent parts with one of the display slots;
wherein response or causing to be responded comprises responding or causing to be responded, by the computing device, to the request with the display slots and their associated organized layout qualification meeting content constituent parts, including the display slot with recursively organized layout qualification meeting content constituent parts.

12. The method of claim 11, wherein said associating includes shifting the content constituent parts within or across display slots.

13. The method of claim 12, wherein said associating comprises associating a plurality of received layout qualification meeting content constituent parts with a display slot of the display slot arrangement, and providing or causing to be provided, by the computing device, one or more user interface elements for a user to cause selective sequential presentation of the received layout qualification meeting content constituent parts via the display slot.

14. The method of claim 13, wherein said providing or causing to be provided comprises providing or causing to be provided, by the computing device, an user interface element for the user to cause sequential presentation of a selected subset of the received layout qualification meeting content constituent parts via the display slot, and at least one or more user interface elements for the user to select another subset of the received layout qualification meeting content constituent parts for sequential presentation via the display slot.

15. The method of claim 13, wherein said providing or causing to be provided comprises providing or causing to be provided, by the computing device, a user interface element for the user to cause a presentation of the organization of the received layout qualification meeting content constituent parts.

16. An apparatus comprising
a processor;
a content retrieve engine configured to be operated by the processor to retrieve content constituent parts of electronic documents; and a content request engine operatively coupled with the content retrieve engine and configured to be operated by the processor to receive a request to generate and return a content aggregation, wherein the content aggregation to be generated is to comprise a plurality content constituent parts to be selected from a plurality of electronic documents, wherein the request includes or references a content aggregation specification specifying the content aggregation to be generated, wherein the content aggregation specification includes a plurality of directives characterizing the content constituent parts to be selected for inclusion into the content aggregation to be generated, wherein the directives characterize the content constituent parts to be selected in terms with a plurality of layout-based descriptions, wherein each layout-based description includes at least one layout qualification to be analyzed against a layout of an electronic document to determine whether the electronic document includes qualifying content constituent part to be selected for inclusion into the content aggregation to be generated and returned;

process the directives of the content aggregation specification;

cause the content retrieve engine to obtain the content constituent parts to be include included in the content aggregation from electronic documents with content constituent parts meeting the layout qualifications of the directives of the content aggregation specification of the request; and respond to the request with the content aggregation having obtained layout qualification meeting content constituent parts selected from the electronic documents in accordance with the directives of the content aggregation specification of the request.

17. The apparatus of claim 16 further comprising a content search engine configured to be operated by the processor to search and locate electronic documents with content constituent parts meeting the layout qualifications; and a content extraction engine operatively coupled to the content request engine to extract layout qualification meeting content constituent parts from retrieved electronic documents.

18. The apparatus of claim 16 further comprising a content presentation engine configured to be operated by the processor to associate obtained layout qualification meeting content constituent parts with display slots of a display slot arrangement, to present the obtained layout qualification meeting content constituent parts.

19. The apparatus of claim 16, further comprising:

a content presentation engine configured to be operated by the processor to receive the plurality of content constituent parts, recursively organize at least some of the received content constituent parts; and associate the recursively organized content constituent parts with one of a plurality of display slots of a display arrangement to present the received layout qualifications meeting content constituent parts.

20. The apparatus of claim 19, wherein the content presentation engine is adapted to associate a plurality of received layout qualification meeting content constituent parts with a display slot of the display slot arrangement, and to provide one or more user interface elements for a user to cause selective sequential presentation of the received layout qualification meeting content constituent parts via the display slot.

21. The apparatus of claim 20, wherein the content presentation engine is further adapted to provide a user interface element for the user to cause sequential presentation of a selected subset of the received layout qualification meeting content constituent parts via the display slot, and at least one or more user interface elements for the user to select another subset of the received layout qualification meeting content constituent parts for sequential presentation via the display slot.

22. The apparatus of claim 21, wherein the content presentation engine is further adapted to provide a user interface element for the user to cause a presentation of the organization of the received layout qualification meeting content constituent parts.

23. The apparatus of claim 19, wherein the content presentation engine is further adapted to select the display slot arrangement.

24. The apparatus of claim 19, wherein the apparatus is a mobile device.

* * * * *